US012228963B2

(12) United States Patent
Kim et al.

(10) Patent No.: US 12,228,963 B2
(45) Date of Patent: Feb. 18, 2025

(54) DISPLAY DEVICE

(71) Applicant: LG ELECTRONICS INC., Seoul (KR)

(72) Inventors: Chulki Kim, Seoul (KR); Seunggyu Kang, Seoul (KR); Jaehun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 22 days.

(21) Appl. No.: 18/094,250

(22) Filed: Jan. 6, 2023

(65) Prior Publication Data

US 2023/0393614 A1 Dec. 7, 2023

(30) Foreign Application Priority Data

Jun. 3, 2022 (KR) .................. 10-2022-0068076

(51) Int. Cl.
*G06F 1/16* (2006.01)
*G02F 1/1333* (2006.01)

(52) U.S. Cl.
CPC .......... *G06F 1/1601* (2013.01); *G06F 1/1652* (2013.01); *G02F 1/133305* (2013.01); *G02F 1/133308* (2013.01); *G02F 1/133314* (2021.01); *G02F 1/133317* (2021.01); *G06F 1/1607* (2013.01)

(58) Field of Classification Search
CPC .... G06F 1/1652; G06F 1/1641; G06F 1/1601; G09F 9/301; G02F 1/133305; G02F 1/133308; G02F 1/133314; G02F 1/133317
See application file for complete search history.

(56) References Cited

U.S. PATENT DOCUMENTS

| 9,116,662 B1* | 8/2015 | Song | G06F 1/1601 |
| 2015/0043136 A1* | 2/2015 | Kim | G02F 1/133305 |
| | | | 361/679.01 |
| 2015/0145837 A1* | 5/2015 | Park | H04N 21/41265 |
| | | | 345/184 |
| 2015/0192952 A1* | 7/2015 | Jung | G06F 1/1601 |
| | | | 361/747 |

(Continued)

FOREIGN PATENT DOCUMENTS

| KR | 10-2015-0025028 A | 3/2015 |
| KR | 10-2015-0081225 A | 7/2015 |

(Continued)

*Primary Examiner* — Nidhi Thaker
(74) *Attorney, Agent, or Firm* — Birch, Stewart, Kolasch & Birch, LLP

(57) ABSTRACT

A display device of the present disclosure may include: a flexible display panel; a flexible inner plate disposed at a rear of the display panel and coupled to the display panel; a frame covering an edge of the inner plate; and a drive module disposed at a rear of the inner plate and configured to provide power to allow the inner plate and the display panel to be bent or flatten, wherein the frame includes: a top cover extending along a first side of the inner plate, and fixed to the inner plate to be bent or flatten along the inner plate; and a side cover extending along a second side of the inner plate that intersects the first side, and fixed to the display panel, and wherein a gap between the top cover and the side cover increases as the display panel is bent.

15 Claims, 32 Drawing Sheets

(56) References Cited

U.S. PATENT DOCUMENTS

| | | | | |
|---|---|---|---|---|
| 2015/0195932 A1* | 7/2015 | Lee | ............................ | H05K 5/03 |
| | | | | 361/749 |
| 2016/0050772 A1* | 2/2016 | Park | ........................ | F16M 13/02 |
| | | | | 361/679.01 |
| 2019/0064577 A1* | 2/2019 | Kim | .................... | G02F 1/133305 |
| 2020/0333846 A1* | 10/2020 | Jan | ......................... | G06F 1/1652 |
| 2022/0019271 A1* | 1/2022 | Kim | .......................... | G06F 1/181 |

FOREIGN PATENT DOCUMENTS

| | | |
|---|---|---|
| KR | 10-2015-0136429 A | 12/2015 |
| KR | 10-2016-0128562 A | 11/2016 |
| KR | 10-1720178 B1 | 3/2017 |
| KR | 10-1749713 B1 | 7/2017 |
| KR | 10-1785444 B1 | 11/2017 |
| KR | 10-2017-0141438 A | 12/2017 |
| KR | 10-2022-0008593 A | 1/2022 |
| KR | 10-2392435 B1 | 4/2022 |

* cited by examiner

DISPLAY DEVICE

CROSS REFERENCE TO RELATED APPLICATION

This application claims the priority benefit of Korean Patent Application No. 10-2022-0068076, filed on Jun. 3, 2022, the disclosure of which is incorporated herein by reference in its entirety.

BACKGROUND

1. Technical Field

The present disclosure relates to a display device. More specifically, the present disclosure relates to a display device capable of changing a curvature of a display panel.

2. Description of the Related Art

With the development of information society, there is an increasing demand for various types of display devices. In order to meet such demand, various display devices, such as a Liquid Crystal Display Device (LCD), a Plasma Display Panel (PDP), an Electro luminescent Display (ELD), a Vacuum Fluorescent Display (VFD), an Organic Light Emitting Diode (OLED), and the like, have been developed and used.

Among these devices, an OLED panel can display an image by depositing an organic material layer capable of emitting light by itself on a substrate on which a transparent electrode is formed. The OLED panel may not only have a thin thickness, but also have flexible characteristics. A lot of research has been conducted on structural characteristics of a display device having such an OLED panel.

SUMMARY

An object of the present disclosure is to solve the above and other problems.

Another object of the present disclosure may be to provide a structure that can freely change a curvature of a display panel.

Another object of the present disclosure may be to provide a mechanism that can freely change a curvature of a display panel.

Another object of the present disclosure may be to provide a flexible frame that can be bent or flatten together with a display panel while covering an edge of the display panel.

Another object of the present disclosure may be to provide a structure that can guide the movement of a frame in response to a change in curvature of a display panel.

Another object of the present disclosure may be to provide a gap cover that can minimize exposure, through a gap in a corner of a frame, of an internal structure of a display device to the outside.

Another object of the present disclosure may be to provide a gap cover that can minimize a step on a corner of a frame.

In accordance with an aspect of the present disclosure for achieving the above and other objects, a display device may include: a flexible display panel; a flexible inner plate disposed at a rear of the display panel and coupled to the display panel; a frame covering an edge of the inner plate; and a drive module disposed at a rear of the inner plate and configured to provide power to allow the inner plate and the display panel to be bent or flatten, wherein the frame includes: a top cover extending along a first side of the inner plate, the top cover being fixed to the inner plate to be bent or flatten along the inner plate; and a side cover extending along a second side of the inner plate that intersects the first side, the side cover being fixed to the display panel, and wherein a gap between the top cover and the side cover may increase as the display panel is bent.

DETAILED DESCRIPTION OF THE PREFERRED EMBODIMENTS

Figure 1:
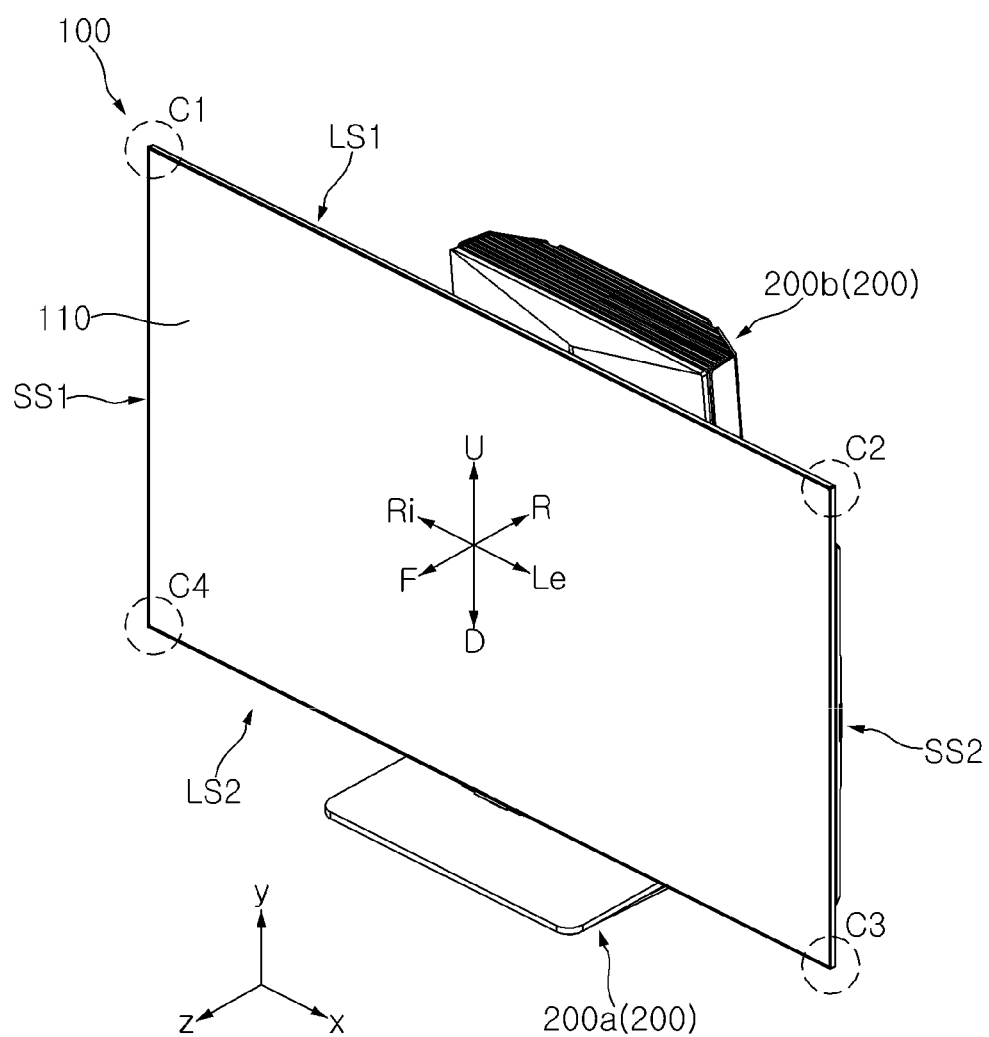
FIGS. 1 to 32 are diagrams illustrating examples of a display device according to embodiments of the present disclosure.

Description will now be given in detail according to exemplary embodiments disclosed herein, with reference to the accompanying drawings. For the sake of brief description with reference to the drawings, the same or equivalent components are provided with the same or similar reference numbers, and description thereof will not be repeated.

In the following description, a suffix such as "module" and "unit" may be used to refer to elements or components. Use of such a suffix herein is merely intended to facilitate description of the specification, and the suffix itself is not intended to give any special meaning or function.

In the present disclosure, that which is well known to one of ordinary skill in the relevant art has generally been omitted for the sake of brevity. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the present application, it should be understood that the terms "comprises, includes," "has," etc. specify the presence of features, numbers, steps, operations, elements, components, or combinations thereof described in the specification, but do not preclude the presence or addition of one or more other features, numbers, steps, operations, elements, components, or combinations thereof.

The directions up U, down D, left Le, right Ri, front F, and rear R shown in the drawings are only for the convenience of explanation, and the technical idea of the present disclosure is not limited by these directions.

In the following description, an organic light emitting diode panel (OLED panel) will be used as an example to describe a display panel, but a display panel applicable to the present disclosure is not limited to the OLED panel.

Referring to FIG. 1, a display device 100 may include a display panel 110. The display panel 110 may define a front surface of the display device 100, and may display an image forward.

The display device 100 may include a first long side LS1, a second long side LS2 opposite the LS1, a first short side SS1 adjacent to the first long side LS1 and the second long side LS2, and a second short side SS2 opposite the first short side SS1. For the convenience of explanation, FIG. 1 illustrates an example in which lengths of the first and second long sides LS1 and LS2 are greater than lengths of the first and second short sides SS1 and SS2, but the lengths of the first and second long sides LS1 and LS2 may be approximately equal to the lengths of the first and second short sides SS1 and SS2.

A direction parallel to the first and second long sides LS1 and LS2 of the display device 100 may be a left-and-right direction. A direction parallel to the first and second short sides SS1 and SS2 of the display device 100 may be an up-and-down direction. A direction perpendicular to the first and second long sides LS1 and LS2, and the first and second short sides SS1 and SS2 of the display device 100 may be a front-and-rear direction.

A direction or side in which the display device 100 displays an image may be a 'front' F, z side, and a direction or side opposite of front may be a 'rear' R side. The first short side SS1 may be a 'right' Ri side. The second short side SS2 may be a 'left' Le, x side. The first long side LS1 may be an 'up (upper)' U, y side. The second long side LS2 may be a 'down (lower)' D side.

The first long side LS1, the second long side LS2, the first short side SS1, and the second short side SS2 may be referred to as edges of the display device 100. In addition, points where the first long side LS1, the second long side LS2, the first short side SS1, and the second short side SS2 meet each other may be referred to as corners.

A point where the first short side SS1 and the first long side LS1 meet each other may be referred to as a first corner C1. A point where the first long side LS1 and the second short side SS2 meet each other may be referred to as a second corner C2. A point where the second short side SS2 and the second long side LS2 meet each other may be referred to as a third corner C3. A point where the second long side LS2 and the first short side SS1 meet each other may be referred to as a fourth corner C4.

Figure 2:
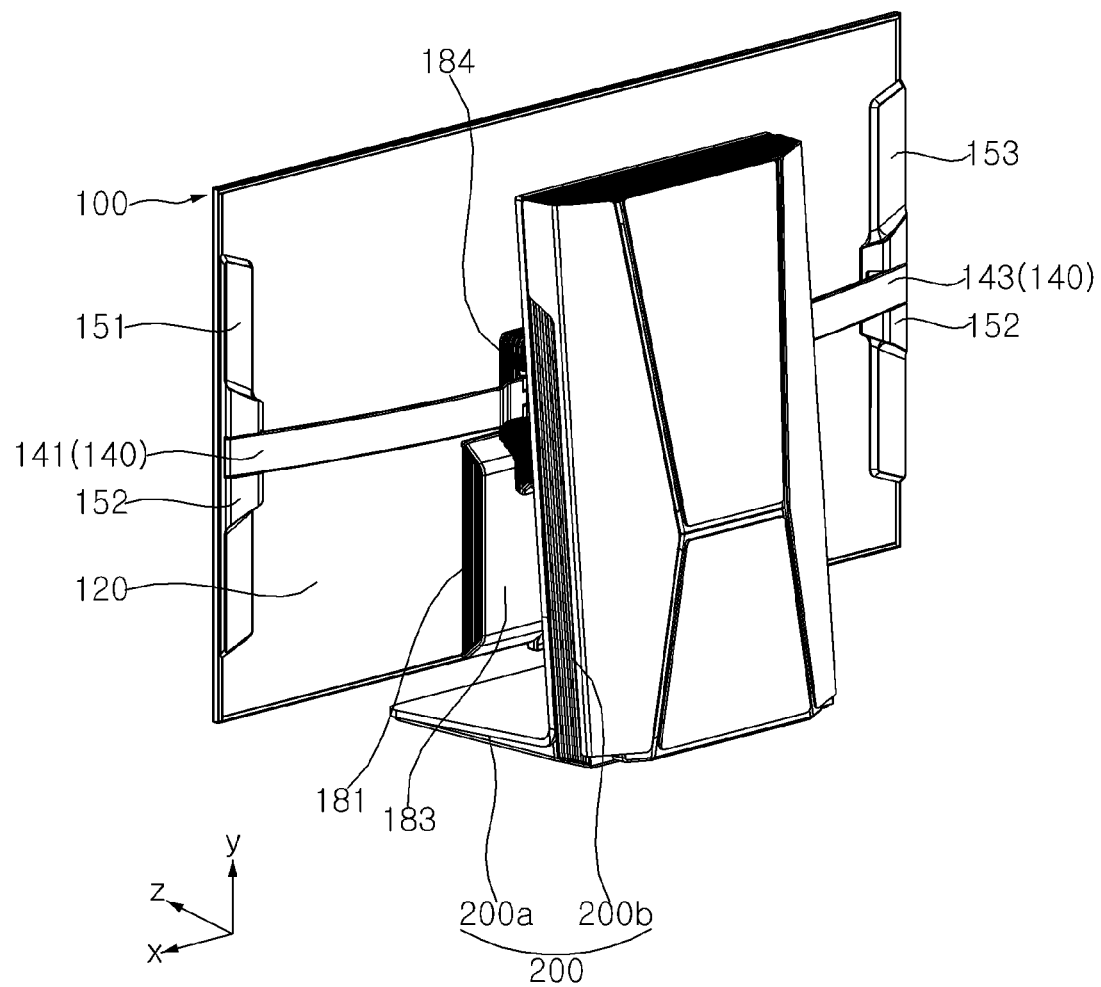

Referring to FIGS. 1 and 2, the display device 100 may include a plate 120. The plate 120 may define a rear surface of the display device 100.

A stand 200 may include a base 200a and a wall 200b. The base 200a may be placed on a ground or floor surface. The wall 200b may extend upward from a rear end of the base 200a. The wall 200b may be disposed at the rear of the plate 120, and may be coupled to the plate 120. Accordingly, the stand 200 may support the display device 100.

For example, electronic components such as a main board, a power supply board, a speaker, and the like may be installed in the wall 200b, and may be electrically connected to the display device 100.

Figure 3:
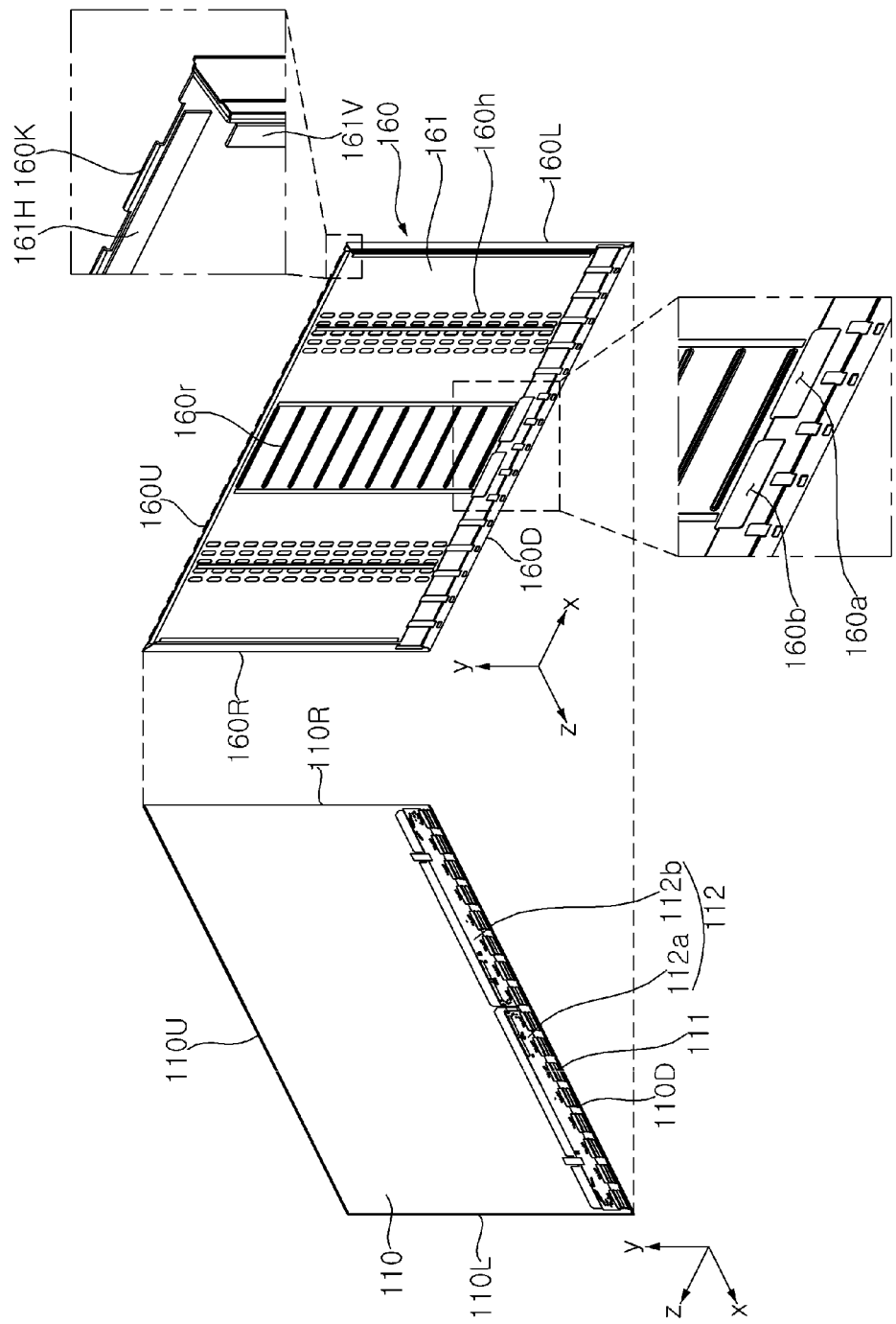

Referring to FIG. 3, the display panel 110 may be an OLED panel. The display panel 110 may define the front surface of the display device 100, and may display an image. The display panel 110 may divide an image into a plurality of pixels and output an image in accordance with color (hue), brightness (value), and saturation (chroma) of each pixel. The display panel 110 may produce light corresponding to a color of red, green, or blue according to a control signal.

A source PCB 112 may be adjacent to a lower side 110D of the display panel 110, and may extend along the lower side 110D. The source PCB 112 may be electrically connected to the display panel 110 through a source chip on film (COF) 111. The source PCB 112 may be electrically connected to a cable (not shown) such as a flexible flat cable (FFC). For example, a first source PCB 112a may extend to the left and right between a left side 110L of the display panel 110 and a central portion of the display panel 110, and may be electrically connected to a first FFC (not shown). For example, a second source PCB 112b may extend to the left and right between a right side 110R of the display panel 110 and the central portion of the display panel 110, and may be electrically connected to a second FFC (not shown).

An inner plate 160 may be disposed at the rear of the display panel 110. The inner plate 160 may have a shape that corresponds to the display panel 110. A cable hole 160a, 160b may be adjacent to a lower side 160D of the inner plate 160, and may be formed through the inner plate 160. A cable, such as a FFC, that is connected to the source PCB 112 may pass through the cable hole 160a, 160b.

A plurality of holes 160h may be disposed at the left or right, away from a central portion of the inner plate 160, may be sequentially disposed between an upper side 160U and the lower side 160D of the inner plate 160, and may be formed through the inner plate 160. A plurality of pressed parts 160r may be disposed at the central portion of the inner plate 160, may be sequentially disposed between the upper side 160U and the lower side 160D of the inner plate 160, and may be recessed from one surface (or a first surface) to another surface (or a second surface) of the inner plate 160.

A plurality of front adhesive members 161H and 161V may be coupled to a front surface 161 of the inner plate 160. Portions of the plurality of front adhesive members 161H and 161V may be adjacent to edges of the inner plate 160. Horizontal adhesive members 161H may extend horizontally. Vertical adhesive members 161V may extend vertically. For example, the plurality of front adhesive members 161H and 161V may be double-sided tapes.

Figure 4:
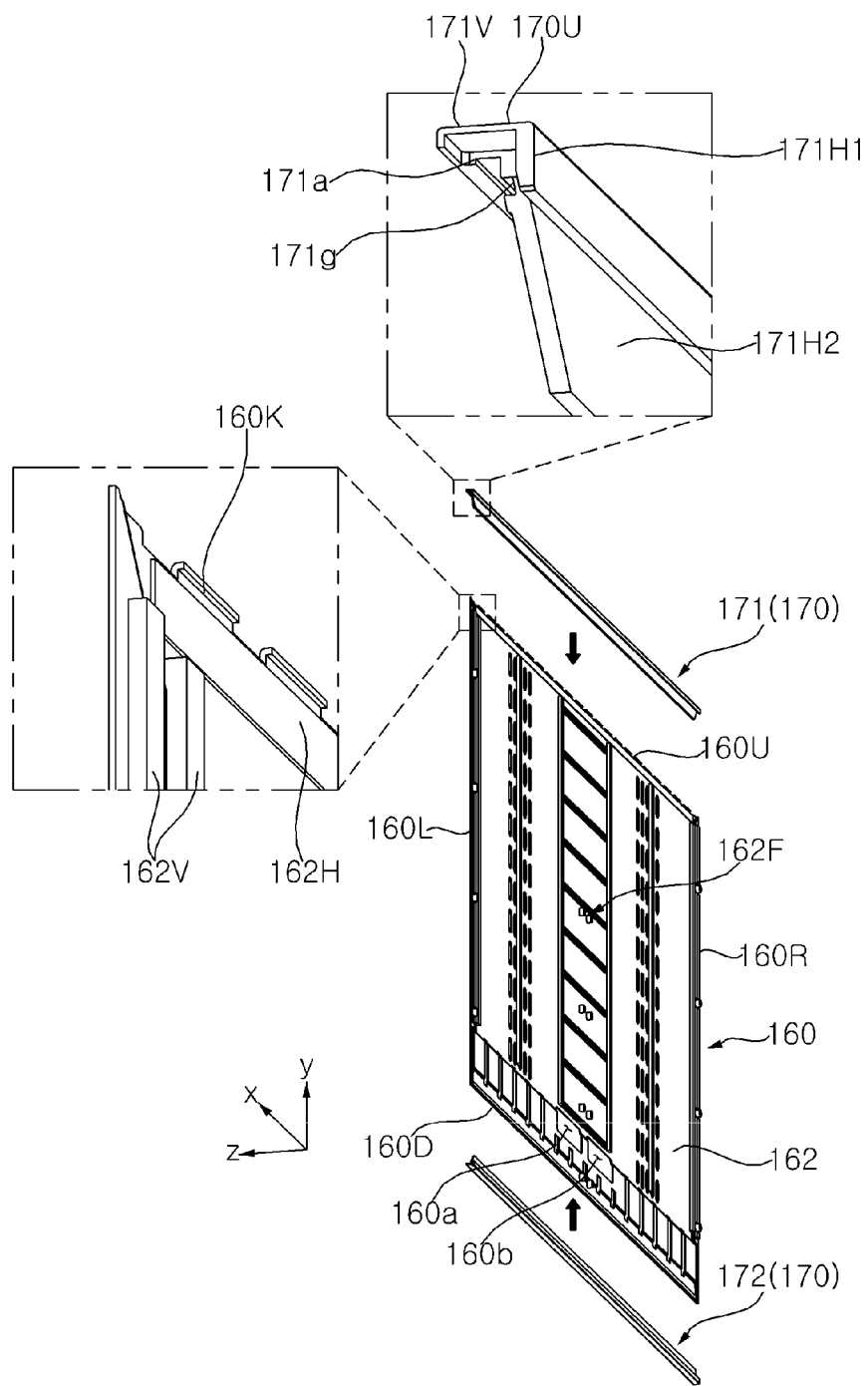
Figure 5:
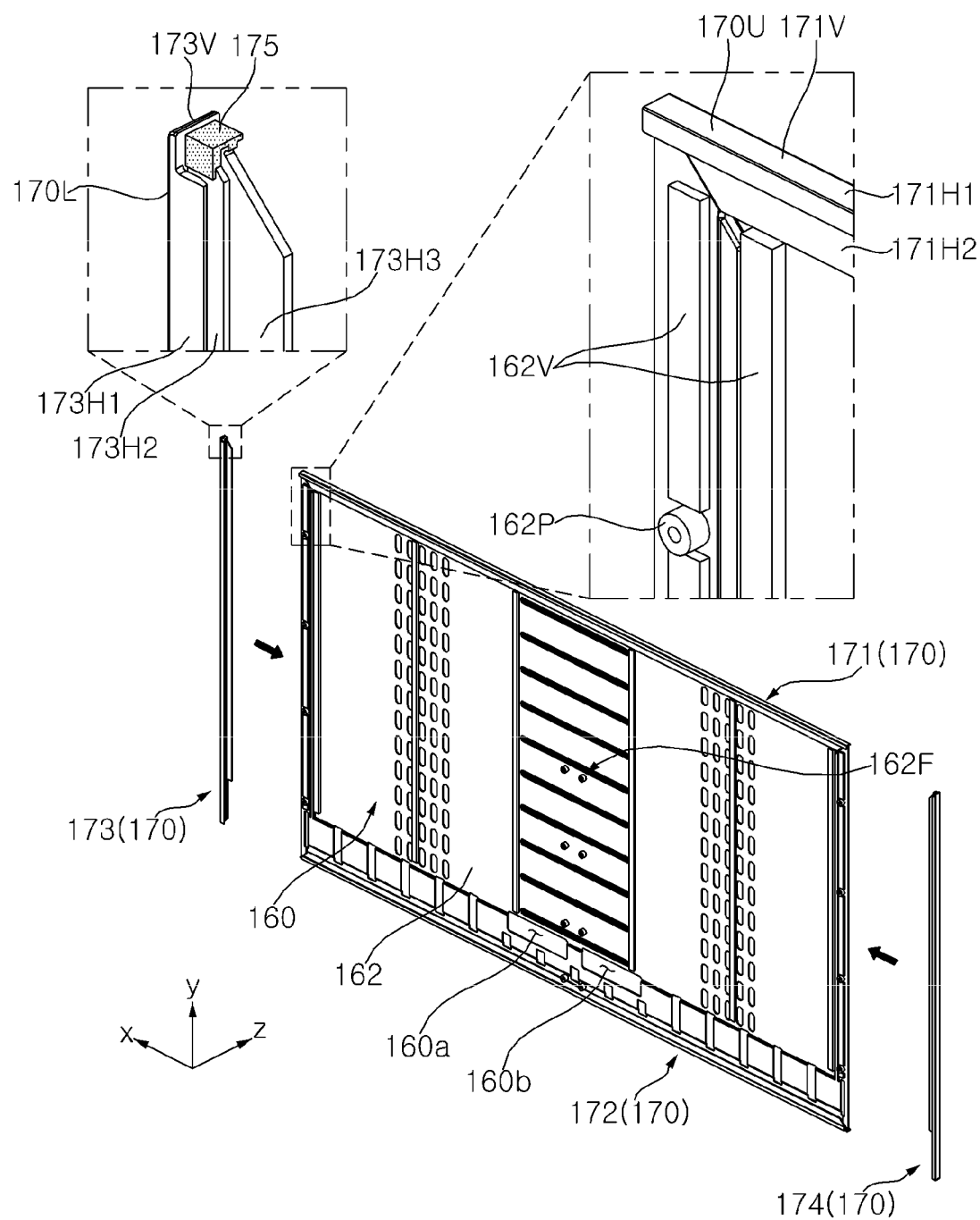

Referring to FIGS. 4 and 5, a plurality of rear adhesive members 162H and 162V may be coupled to a rear surface 162 of the inner plate 160. Portions of the plurality of rear adhesive members 162H and 162V may be adjacent to the edges of the inner plate 160. Horizontal adhesive members 162H may extend horizontally. Vertical adhesive members 162V may extend vertically. For example, the plurality of rear adhesive members 162H and 162V may be double-sided tapes.

A first frame 171 may be adjacent to the upper side 160U of the inner plate 160, and may extend along the upper side 160U. The first frame 171 may cover the upper side 160U. The first frame 171 may be referred to as a top cover 171 or a top frame 171.

A second frame 172 may be adjacent to the lower side 160D of the inner plate 160, and may extend along the lower side 160D. The second frame 172 may cover the lower side 160D. The second frame 172 may be referred to as a bottom cover 172 or a bottom frame 172.

A third frame 173 may be adjacent to a left side 160L of the inner plate 160, and may extend along the left side 160L. The third frame 173 may cover the left side 160L. The third frame 173 may be referred to as a side cover 173 or a side frame 173.

A fourth frame 174 may be adjacent to a right side 160R of the inner plate 160, and may extend along the right side 160R. The fourth frame 174 may cover the right side 160R. The fourth frame 174 may be referred to as a side cover 174 or a side frame 174.

A frame 170 may define the edges of the display device 100. That is, the first frame 171 may define the first long side LS1, the second frame 172 may define the second long side LS2, the third frame 173 may define the second short side SS2, and the fourth frame 174 may define the first short side SS1 (see FIG. 1). The first frame 171, the second frame 172, the third frame 173, and the fourth frame 174 may be separated from each other at the corners C1, C2, C3, and C4 (see FIG. 1). The frame 170 may be referred to as a middle cabinet 170, a panel guide 170, an end cover 170, or a case top 170.

For example, the frame 170 may include a metal material such as aluminum (Al). In another example, the frame 170 may include a plastic or resin material.

Meanwhile, the third frame 173 and the fourth frame 174 may be fixed to the display panel 110. The first frame 171 and the second frame 172 may be fixed to the inner plate 160 to be bent or flatten together with the inner plate 160.

The first frame 171 and the second frame 172 may be up-down symmetric, and the third frame 173 and the fourth frame 174 may be left-right symmetric. That is, the description of the first frame 171 may be equally applied to the second frame 172 (and vice versa), and the description of the third frame 173 may be equally applied to the fourth frame 174 (and vice versa).

Figure 6:
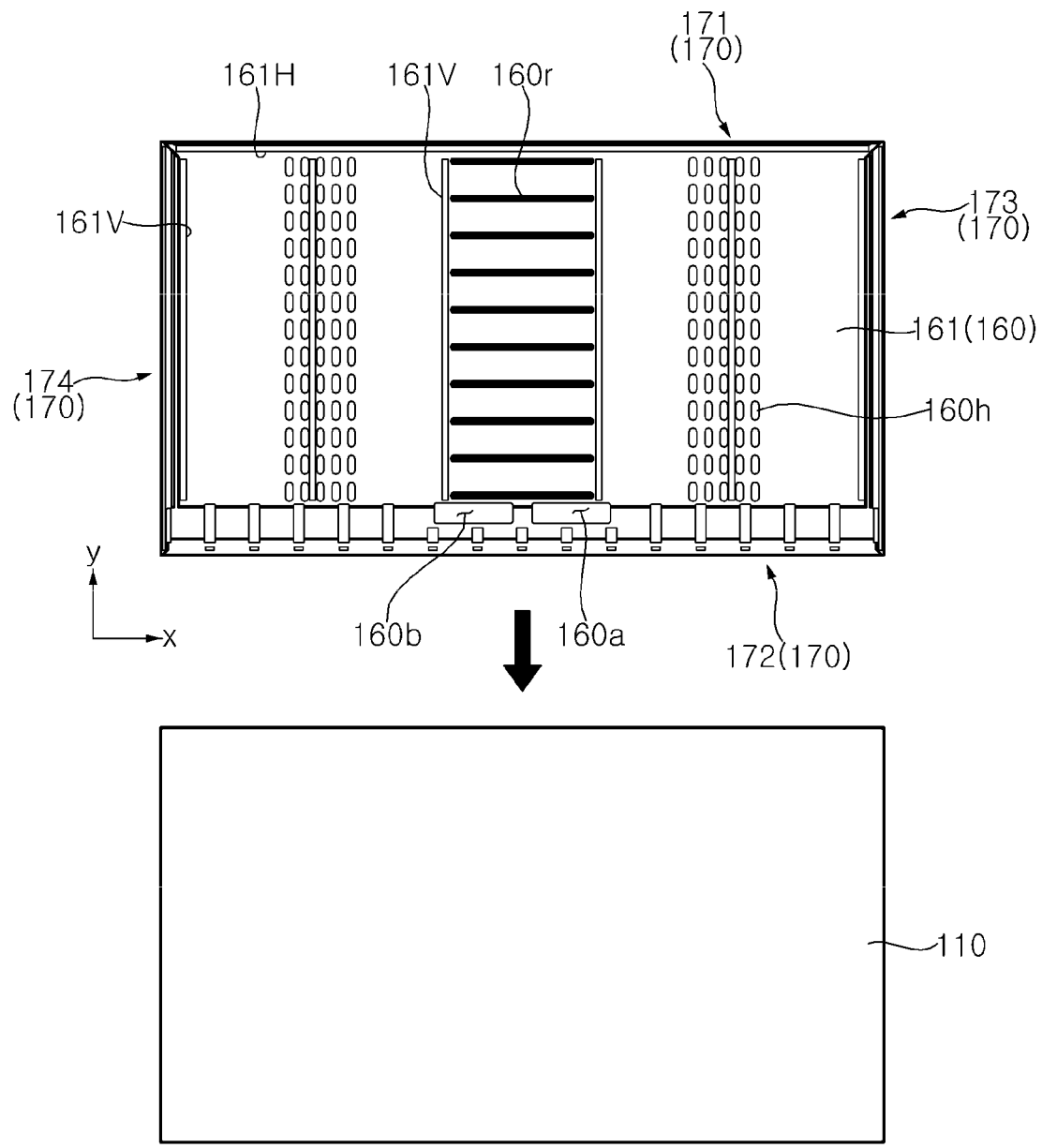

Referring to FIG. 6, a rear surface of the display panel 110 may be disposed at the front of the front surface 161 of the inner plate 160, and may be coupled to the plurality of front adhesive members 161H and 161V. Accordingly, the display panel 110 may be coupled to the inner plate 160.

Figure 7:
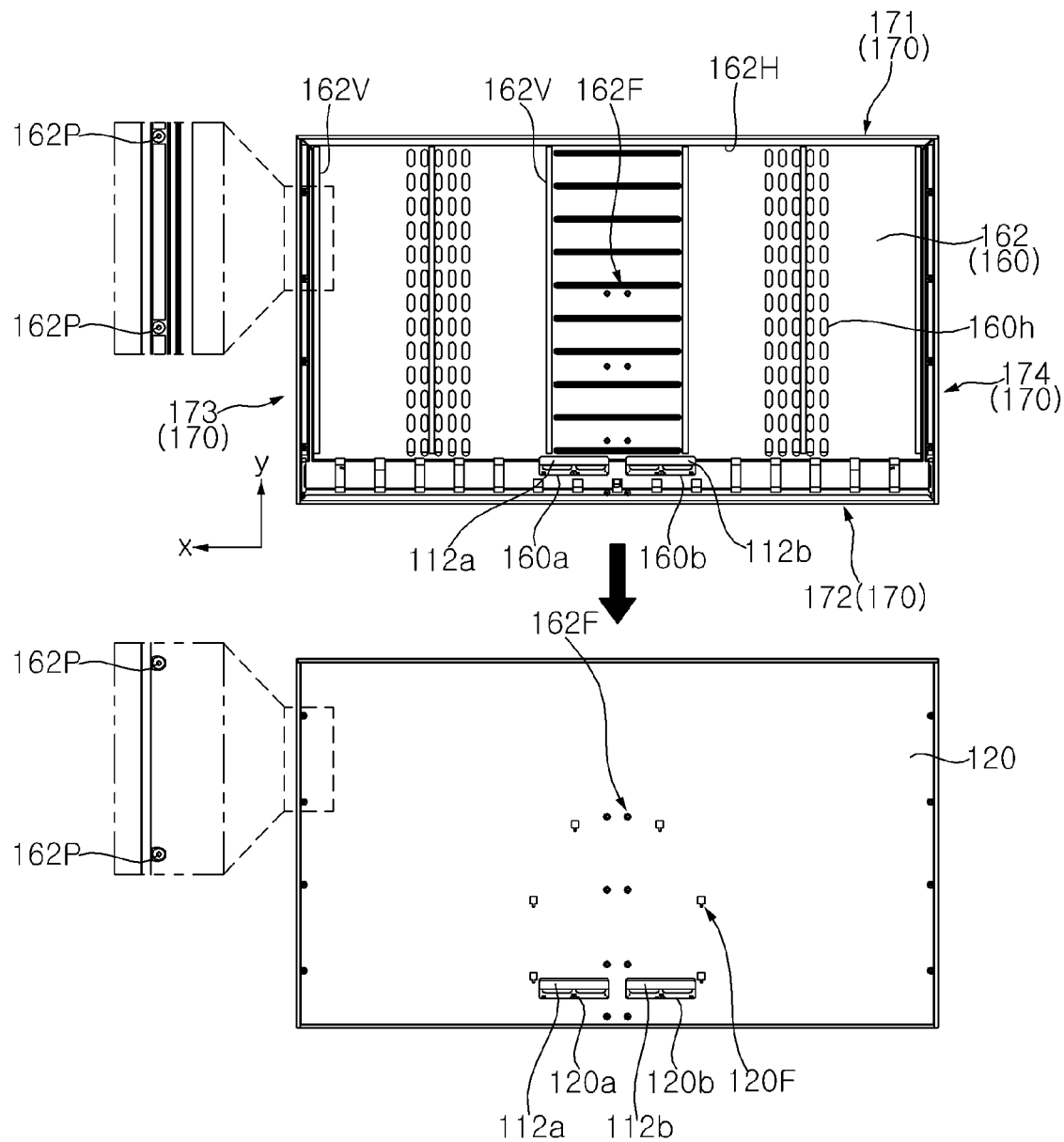

Referring to FIG. 7, a front surface of the plate 120 may be disposed at the rear of the rear surface 162 of the inner plate 160, and may be coupled to the plurality of rear adhesive members 162H and 162V. Accordingly, the plate 120 may be coupled to the inner plate 160. The plate 120 may be referred to as an outer plate 120.

A cable hole 120a, 120b may be formed through the plate 120. The cable hole 120a, 120b of the plate 120 may be aligned with the cable hole 160a, 160b of the inner plate 160 in the front-and-rear direction.

A side fixing part 162P may protrude rearward from the rear surface 162 of the inner plate 160. The side fixing part 162P may be a PEM nut (or self-clinching nut). Among a plurality of side fixing parts 162P, side fixing parts adjacent to the left side of the inner plate 160 may be spaced apart from one another in the up-and-down direction, and may pass through the plate 120.

Among the plurality of side fixing parts 162P, side fixing parts adjacent to the right side of the inner plate 160 may be spaced apart from one another in the up-and-down direction, and may pass through the plate 120. The side fixing parts 162P adjacent to the right side of the inner plate 160 may be referred to as first side fixing parts 162P, and the side fixing parts 162P adjacent to the left side of the inner plate 160 may be referred to as second side fixing parts 162P.

A center fixing part 162F may protrude rearward from the rear surface 162 of the inner plate 160. The center fixing part 162F may be a PEM nut (or self-clinching nut). A plurality of center fixing parts 162F may be disposed at the central portion of the inner plate 160, may be spaced apart from one another in the up-and-down direction, and may pass through the plate 120.

A locking recess 120F may be formed through the plate 120. A plurality of locking recesses 120F may be disposed in the vicinity of the plurality of center fixing parts 162F.

Figure 8:
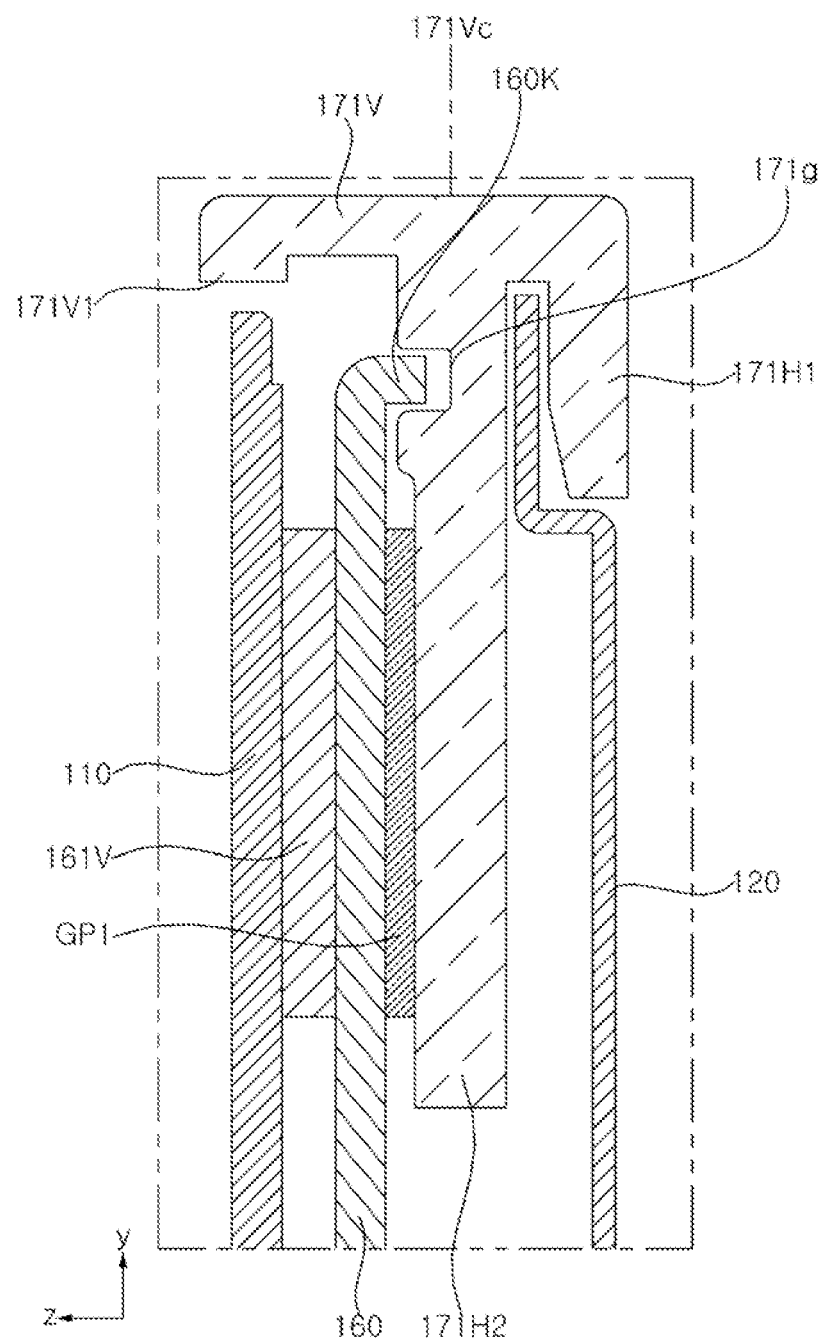

Referring to FIG. 8, the first frame 171 may include a first vertical portion 171V and a first horizontal portion 171H1, 171H2.

A first adhesive member GP1 may be disposed between a first center horizontal portion 171H2 to be described later with reference to FIG. 28 and the inner plate 160, and may be coupled to the first center horizontal portion 171H2 and the inner plate 160.

Accordingly, the first frame 171 may be coupled to the inner plate 160.

Figure 9:
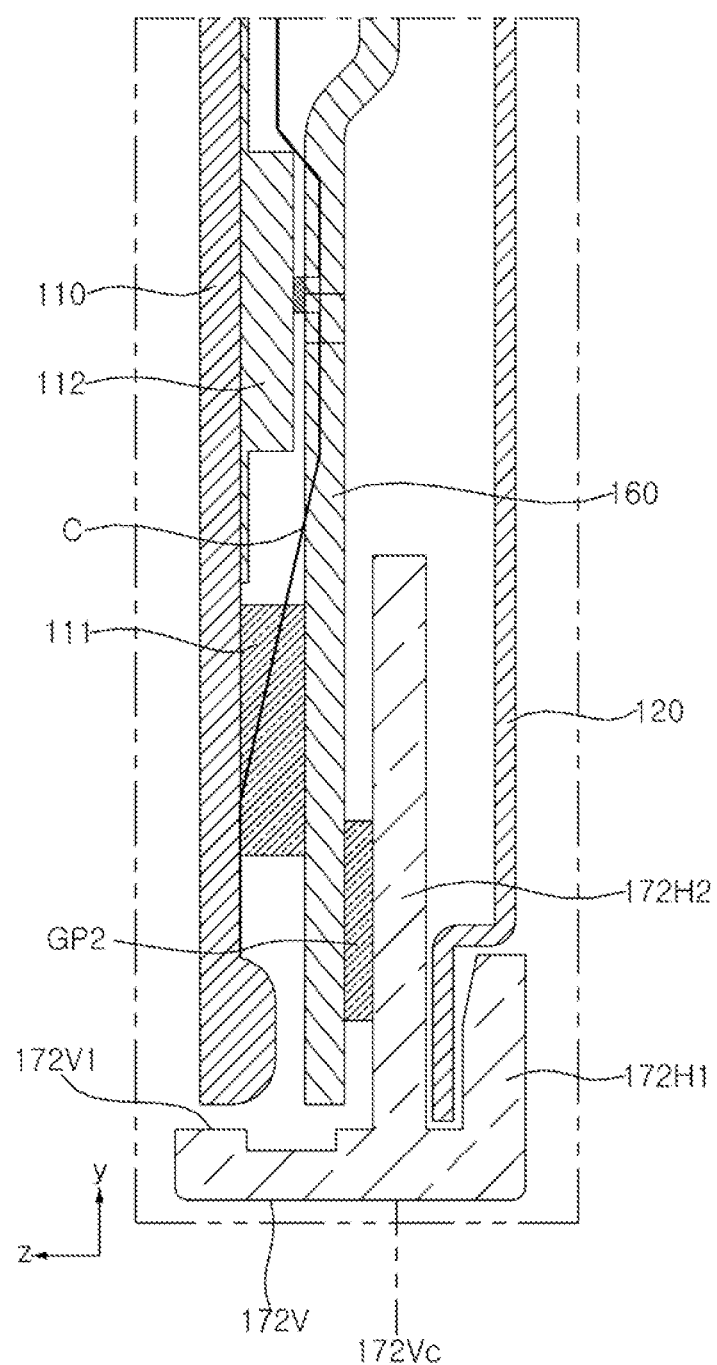

Referring to FIG. 9, the second frame 172 may include a second vertical portion 172V and a second horizontal portion 172H1, 172H2. The second frame 172 and the first frame 171 may be up-down symmetric (see FIGS. 8 and 28).

A second adhesive member GP2 may be disposed between the inner plate 160 and a second center horizontal portion 172H2 that is up-down symmetric with the first center horizontal portion 171H2 to be described later with reference to FIG. 28, and may be coupled to the inner plate 160 and the second center horizontal portion 172H2.

Accordingly, the second frame 172 may be coupled to the inner plate 160.

Figure 10:
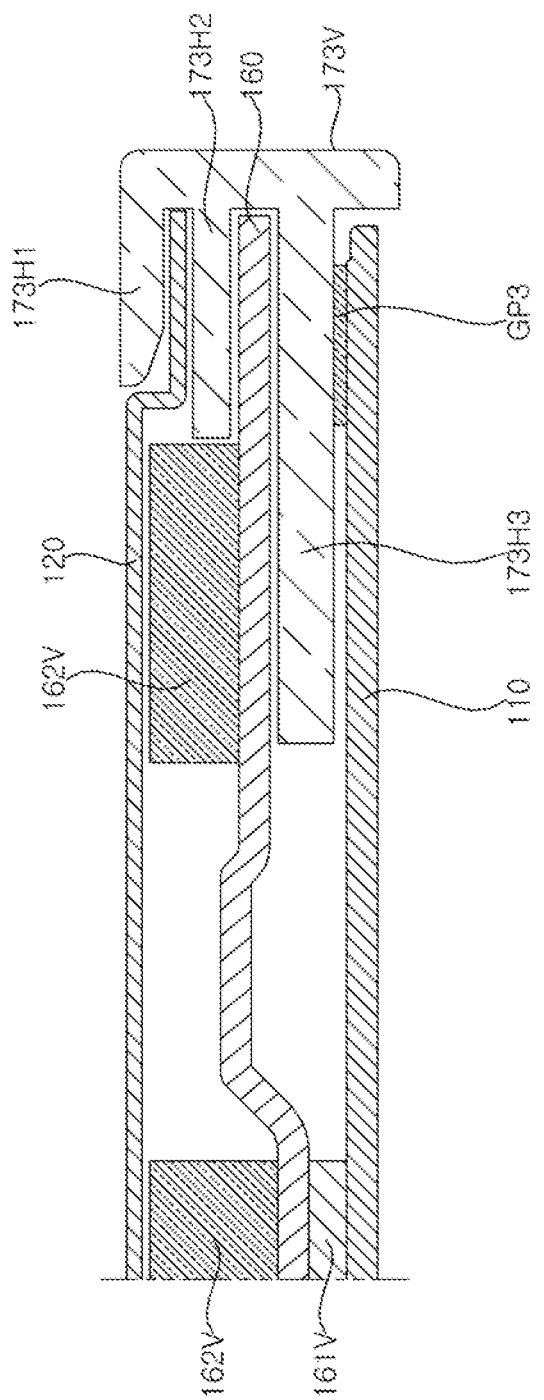

Referring to FIG. 10, the third frame 173 may include a third vertical portion 173V and a third horizontal portion 173H1, 173H2, 173H3. The third frame 173 and the fourth frame 174 may be left-right symmetric (see FIG. 5). The description of the third frame 173 may be equally applied to the fourth frame 174 (see FIG. 5).

A third adhesive member GP3 may be disposed between a third front horizontal portion 173H3 to be described later with reference to FIG. 29 and the display panel 110, and may be coupled to the third front horizontal portion 173H3 and the display panel 110.

Accordingly, the third frame 173 may be coupled to the display panel 110. Similarly, the fourth frame 174 (see FIG. 4) may be coupled to the display panel 110.

Figure 11:
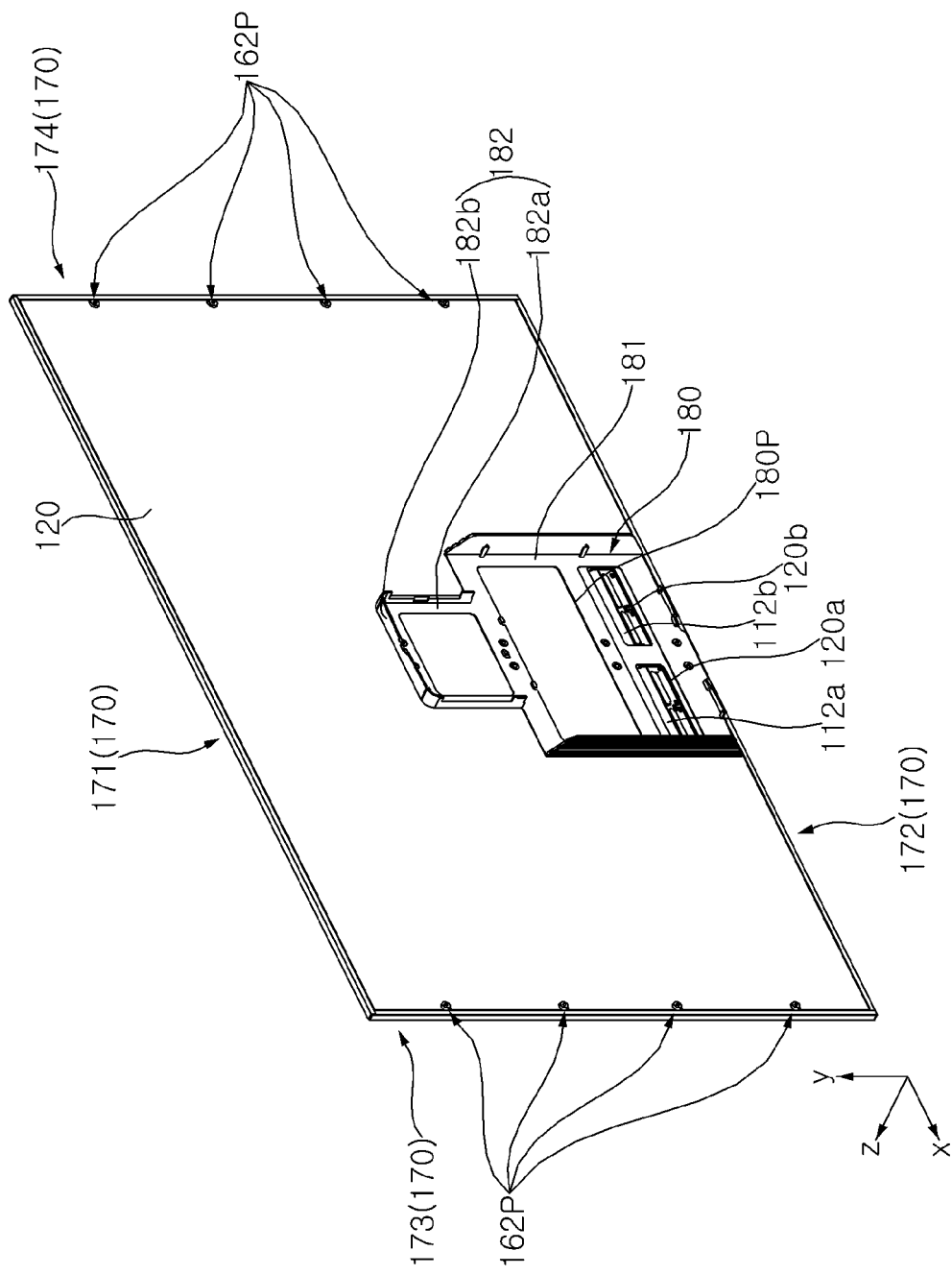

Referring to FIG. 11, a bracket 180 may be disposed at the rear of the plate 120. A plurality of locking protrusions (not shown) may protrude forward from a front surface of the bracket 180, and may be disposed along a periphery of the bracket 180, and may be caught in or locked into the plurality of locking recesses 120F. A plurality of fastening members such as screws may pass through the bracket 180 to be fastened to the respective plurality of center fixing parts 162F. Accordingly, the bracket 180 may be coupled to the plate 120.

In addition, the bracket 180 may include a first bracket 181 and a second bracket 182. For example, the first bracket 181 and the second bracket 182 may be formed as one body.

The first bracket 181 may be adjacent to a lower side of the plate 120, and may have a hole corresponding to the cable hole 120a, 120b of the plate 120.

The second bracket 182 may extend upward from the first bracket 181. A size of the second bracket 182 may be less than a size of the first bracket 181.

Figure 12:
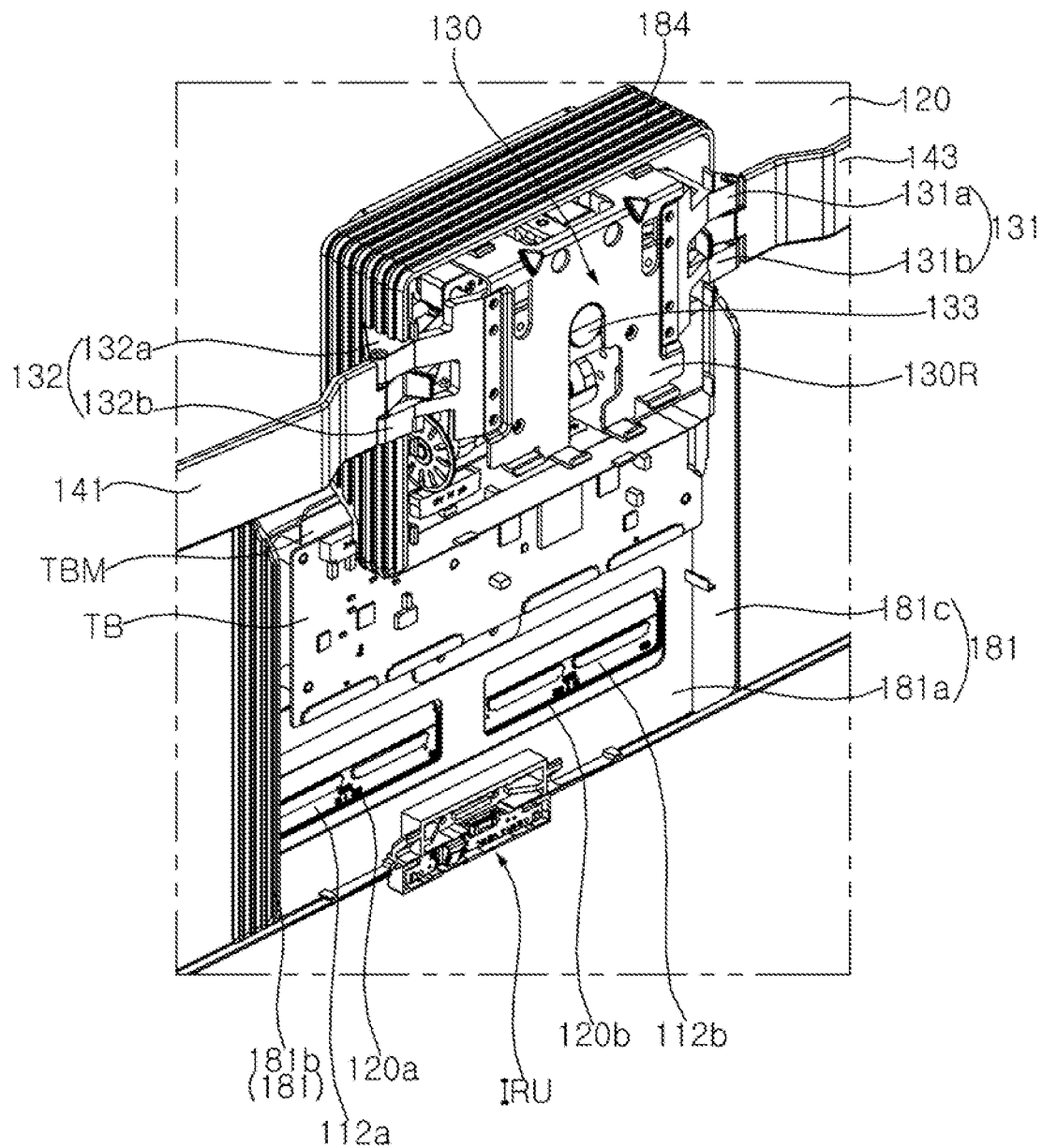

Referring to FIGS. 11 and 12, a first bracket base 181a may define a flat portion of the first bracket 181, and may be open to the front and rear. A left bending portion 181b may protrude rearward from a left side of the first bracket base 181a, and may extend vertically. A right bending portion 181c may protrude rearward from a right side of the first bracket base 181a, and may extend vertically.

A second bracket base 182a may define a flat portion of the second bracket 182, and may be open to the front and rear. A bending portion 182b may protrude rearward from upper, left, and right sides of the second bracket base 182a, and may extend along a periphery of the second bracket base 182a.

A timing controller board TB may be coupled to the first bracket base 181a through a mount plate TBM. The first FFC (not shown) that is connected to the first source PCB 112a may be connected to the timing controller board TB through a first cable hole 120a. The second FFC (not shown) that is connected to the second source PCB 112b may be connected to the timing controller board TB through a second cable hole 120b.

An upper cover 184 may be coupled to the second bracket base 182a. The upper cover 184 may extend along the bending portion 182b.

A drive module 130 may be disposed in the upper cover 184. A rear bracket 130R of the drive module 130 may be disposed opposite a front bracket 130F (see FIG. 17), which will be described later, with respect to a lead screw 133. The lead screw 133 may connect the front bracket 130F and the rear bracket 130R. One end (or a first end) of a first wing bracket 131 may be coupled to the front bracket 130F, and another end (or a second end) of the first wing bracket 131 may be coupled to the rear bracket 130R. One end (or a first end) of a second wing bracket 132 may be coupled to the front bracket 130F, and another end (or a second end) of the second wing bracket 132 may be coupled to the rear bracket 130R.

Figure 13:
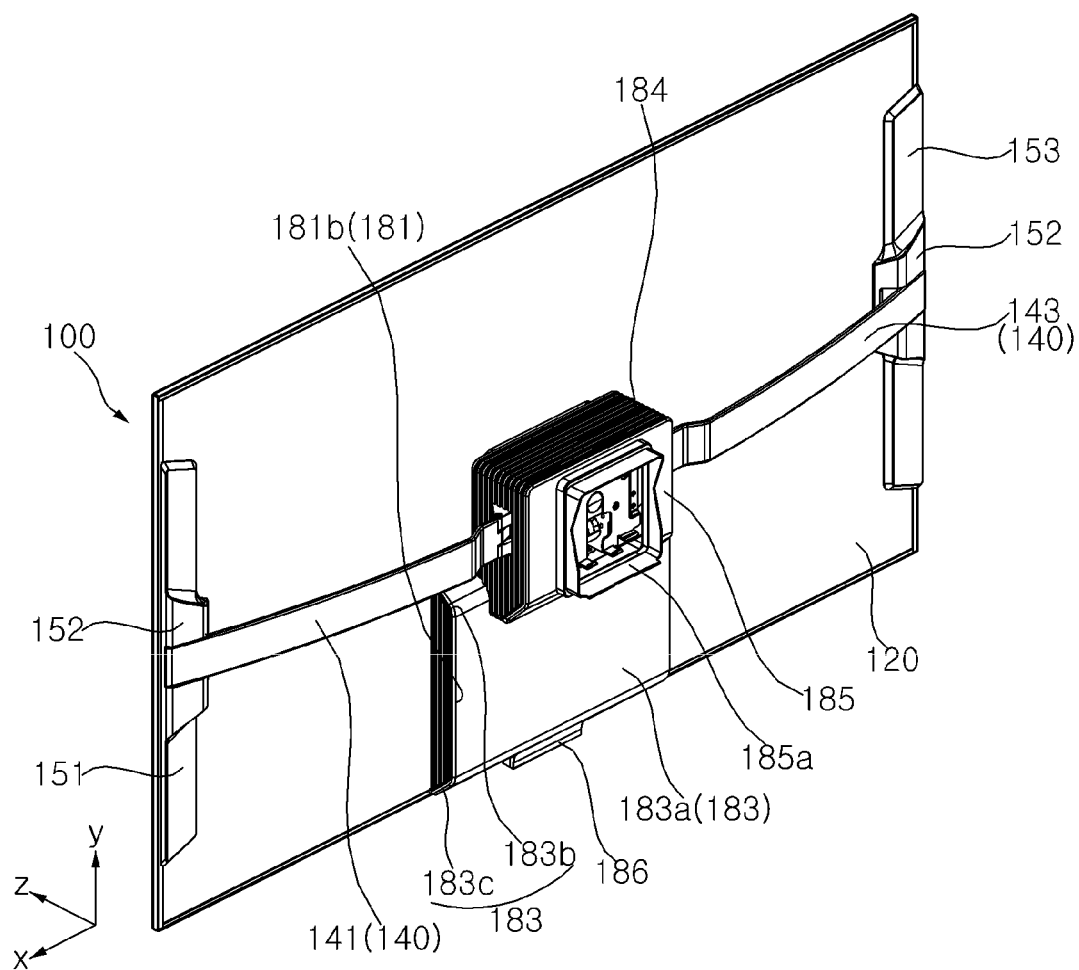

Referring to FIGS. 12 and 13, a rear cover 185 may be disposed at the rear of the drive module 130, and may be coupled to the rear bracket 130R. A rear hole 185a may be formed through the rear cover 185. The wall 200b of the stand 200 described above with reference to FIGS. 1 and 2 may be coupled to the rear bracket 130R through the rear hole 185a. In addition, a cable and the like may be connected to the display device 100 and the wall 200b of the stand 200 through the rear hole 185a.

A lower cover 183 may be disposed at the rear of the timing controller board TB, and may be coupled to the first bracket 181. The lower cover 183 may cover the timing controller board TB.

Meanwhile, a first side frame 153 may be adjacent to a right side of the plate 120, and may be coupled to a rear surface of the plate 120. A first wing 143 may be coupled to the first side frame 153 through a sliding mount 152, and may be pivotally connected to the first wing bracket 131.

A second side frame 151 may be adjacent to a left side of the plate 120, and may be coupled to the rear surface of the plate 120. A second wing 141 may be coupled to the second side frame 151 through a sliding mount 152, and may be pivotally connected to the second wing bracket 132.

Figure 14:
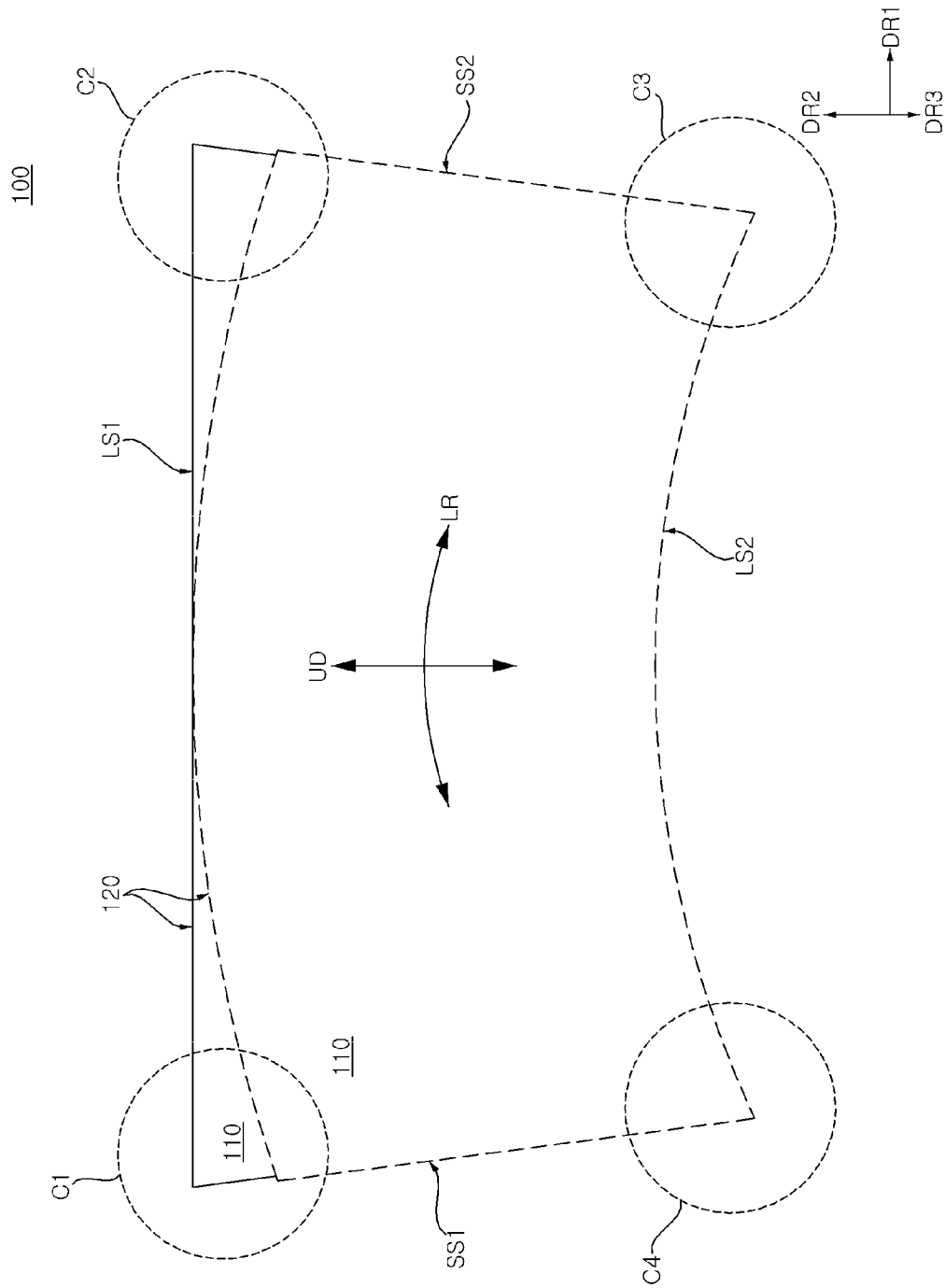

Referring to FIG. 14, the plate 120 may be flexible. For example, the plate 120 may be a metal plate. The plate 120 may be referred to as an outer plate 120, a flexible plate 120, a frame 120, or a module cover 120. The display panel 110 may be disposed at the front or on the front surface of the plate 120. The display panel 110 may be flexible. For example, the display panel 110 may be an OLED panel. The inner plate 160 and the frame 170 may be flexible (see FIG. 7). For example, the inner plate 160 may be a metal plate.

The display panel 110 may define the front surface of the display device 100, and may display an image. The display panel 110 may divide an image into a plurality of pixels and output an image in accordance with color (hue), brightness (value), and saturation (chrome) of each pixel. The display panel 110 may produce light corresponding to a color of red, green, or blue according to a control signal.

The display device 100 may have a variable curvature. Left and right sides of the display device 100 may move forward. For example, when an image is viewed from the front of the display device 100, the display device 100 may be curved concavely or inwardly. Here, the plate 120 may be bent with the same curvature as the display panel 110. Alternatively, the display panel 110 may be bent to correspond to a curvature of the plate 120.

Figure 15:
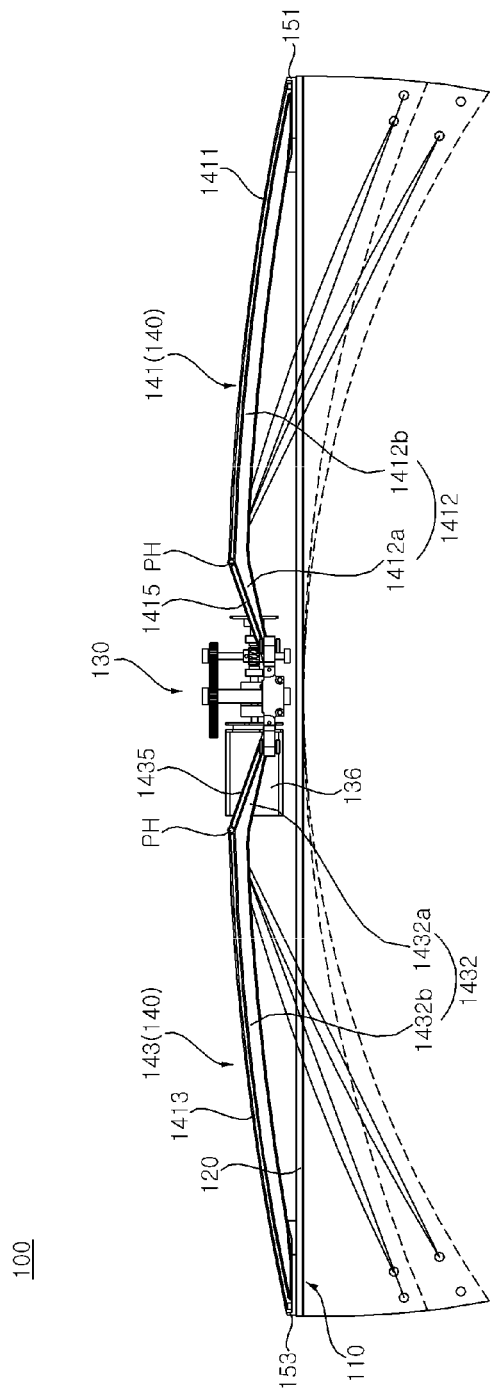
Figure 16:
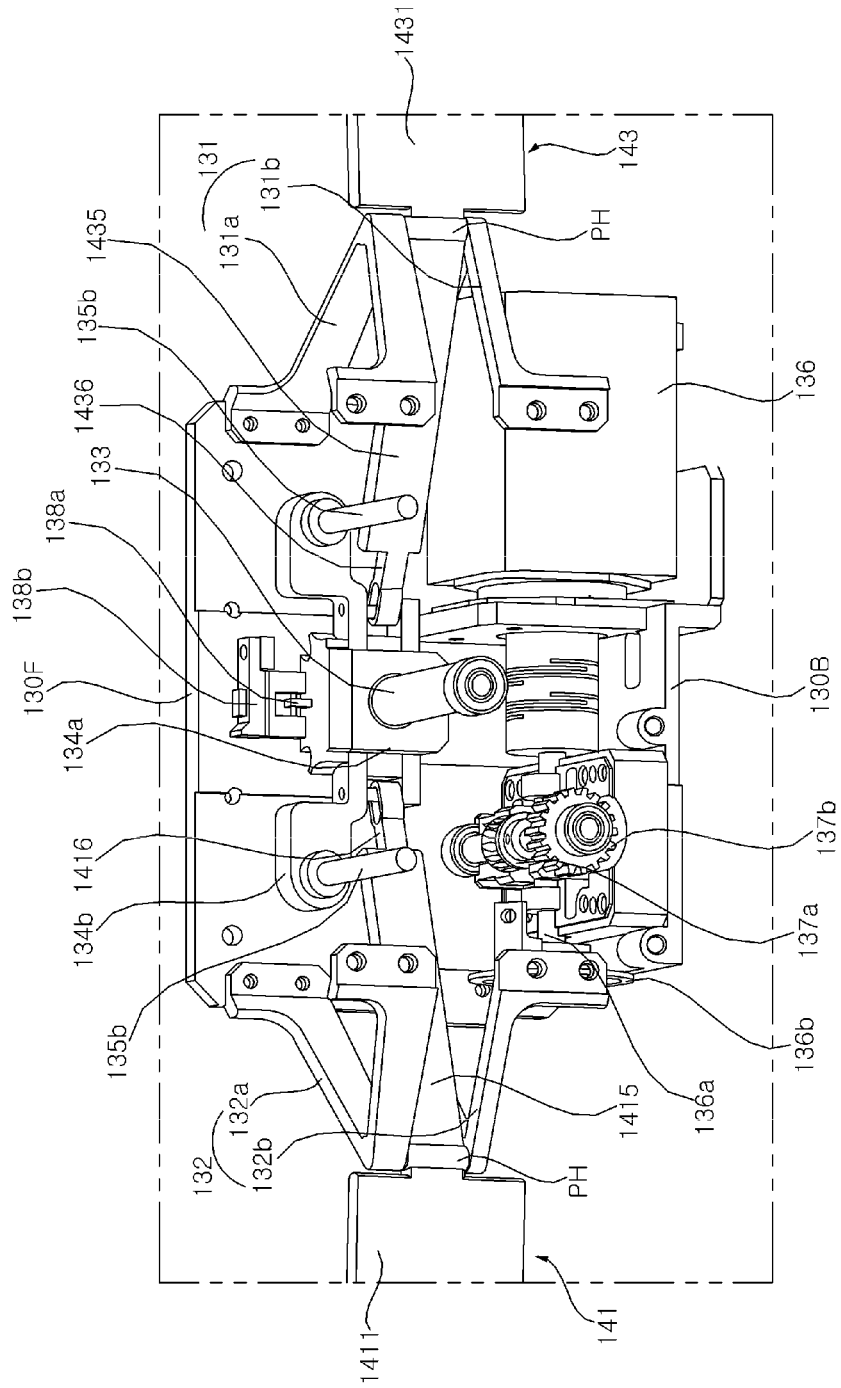

Referring to FIGS. 15 and 16, the plate 120 may have a shape that corresponds to the display panel 110, and may be coupled to the rear of the display panel 110.

The drive module 130 may be coupled to the rear of the plate 120. The drive module 130 may include the front bracket 130F, a base 130B, and a wing bracket 131, 132.

The front bracket 130F may be coupled or fixed to the rear or the rear surface of the plate 120. The front bracket 130F may have a flat rectangular plate shape. The base 130B may be coupled or fixed to the front bracket 130F, and may define a bottom of the drive module 130.

A plurality of wing brackets 131 and 132 may be provided. The plurality of wing brackets 131 and 132 may include the first wing bracket 131 and the second wing bracket 132. The first wing bracket 131 may be coupled or fixed to the front bracket 130F, and may be opposite the second wing bracket 132. The second wing bracket 132 may also be coupled or fixed to the front bracket 130F.

The wing bracket 131, 132 may have a V-shape. The wing bracket 131, 132 may be provided in pair. An upper bracket 131a, 132a of the wing bracket 131, 132 may be disposed in parallel with a lower bracket 131b, 132b of the wing bracket 131, 132. A pin (refer to the pin P of FIG. 20) may be disposed between the upper bracket 131a, 132a and the lower bracket 131b, 132b. The pin may connect vertices of the upper bracket 131a, 132a and the lower bracket 131b, 132b.

The first wing 143 may be pivotally connected to the first wing bracket 131. The second wing 141 may be pivotally connected to the second wing bracket 132. The first wing 143 and the second wing 141 may be line-symmetric with respect to the drive module 130. The descriptions of the first wing 143 and the first wing bracket 131 may be equally applied to the second wing 141 and the second wing bracket 132 (and vice versa). The first wing 143 may include a wing plate 1431, a pivot shaft PH, and a lever 1435.

A wing plate 1411, 1431 may be an elongated plate. A lever 1415, 1435 may extend from one end of the wing plate 1411, 1431. The lever 1415, 1435 may be an elongated plate. A length of the lever 1415, 1435 may be less than a length of the wing plate 1411, 1431, and a width of the lever 1415, 1435 may be less than a width of the wing plate 1411, 1431. A thickness of the wing plate 1411, 1431 may be substantially equal to a thickness of the lever 1415, 1435.

A pivot shaft PH may be pivotally connected to the pin of the wing bracket 131, 132. The pin may be inserted into the pivot shaft PH of the wing 141, 143. The wing 141, 143 may pivot on the wing bracket 131, 132 about the pin.

Figure 17:
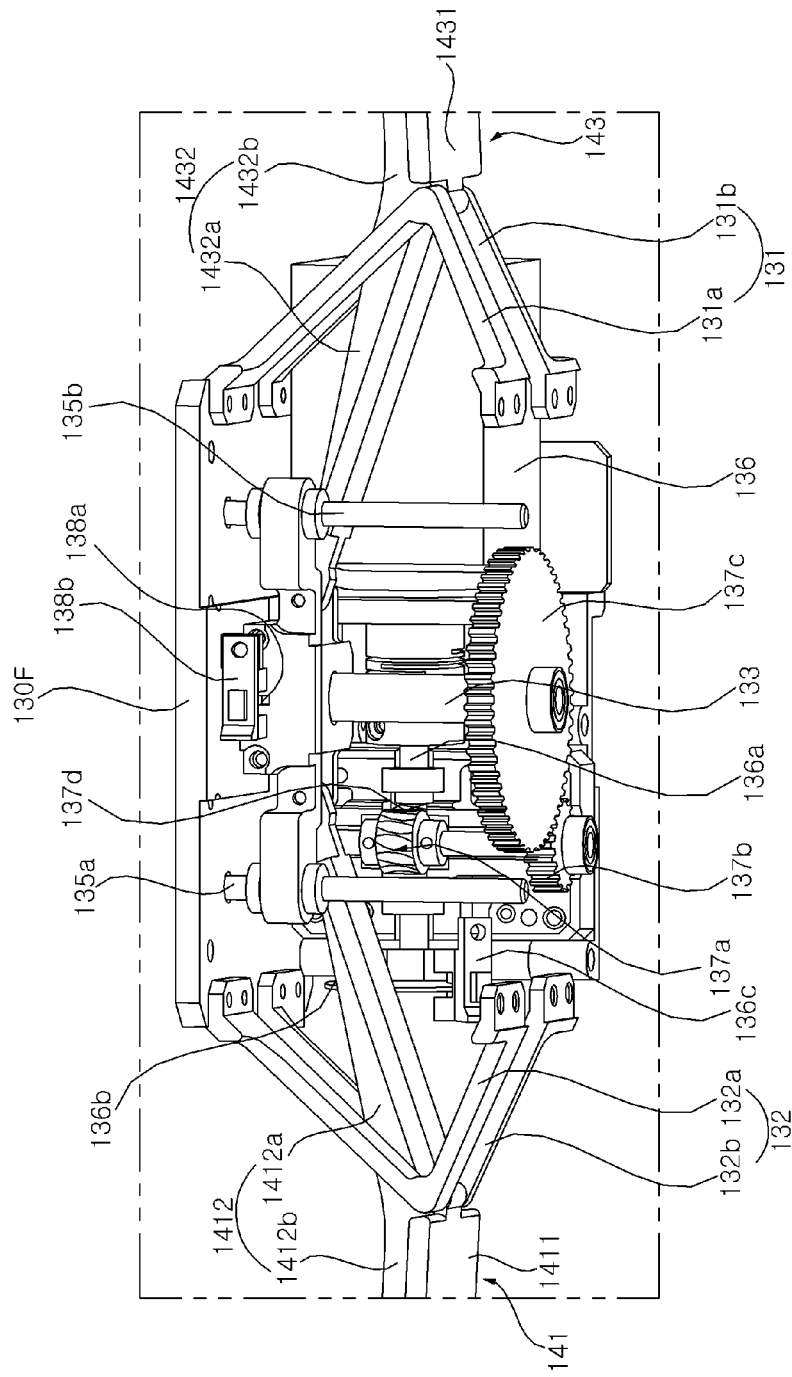

Referring to FIGS. 16 and 17, the lead screw 133 may be rotatably installed to the front bracket 130F. For example, the lead screw 133 may be elongated, and may have a thread on an outer surface thereof. The lead screw 133 may be inserted into a slider 134a. The slider 134a and the lead screw 133 may be threadedly coupled to each other. When the lead screw 133 rotates, the slider 134a may reciprocate in a longitudinal direction of the lead screw 133.

A slider guide 134b may be fixed on the slider 134a. The slider guide 134b may move together with the slider 134a. A guide shaft 135a, 135b may be coupled or fixed to the front bracket 130F. The guide shaft 135a, 135b may be parallel to the lead screw 133. The guide shaft 135a, 135b may include a first guide shaft 135a and a second guide shaft 135b. The first guide shaft 135a may be disposed opposite the second guide shaft 135b with respect to the lead screw 133. The guide shaft 135a, 135b may be inserted into the slider guide 134b. Accordingly, when the lead screw 133 rotates, the slider 134*a* may reciprocate in the longitudinal direction of the lead screw 133 in a stable manner.

A motor 136 may be mounted on the base 130B. The motor 136 may be an electric motor. The motor 136 may be a step motor. The motor 136 may control the number of steps corresponding to a rotation angle, a direction of rotation, and a rotational speed. A rotating shaft 136*a* of the motor 136 may intersect the longitudinal direction of the lead screw 133. The motor 136 and the rotating shaft 136*a* of the motor 136 may be disposed between the lead screw 133 and the base 130B. A worm 137*d* may be fixed to the rotating shaft 136*a* of the motor 136, and may rotate together with the rotating shaft 136*a* of the motor 136. A worm gear 137*a* may mesh with the worm 137*d*. A transmission gear 137*b* may rotate coaxially with the worm gear 137*a*. A drive gear 137*c* may be fixed to one end of the lead screw 133 to rotate together with the lead screw 133. The drive gear 137*c* may mesh with the transmission gear 137*b*. A diameter of the drive gear 137*c* may be greater than a diameter of the transmission gear 137*b*.

Figure 18:
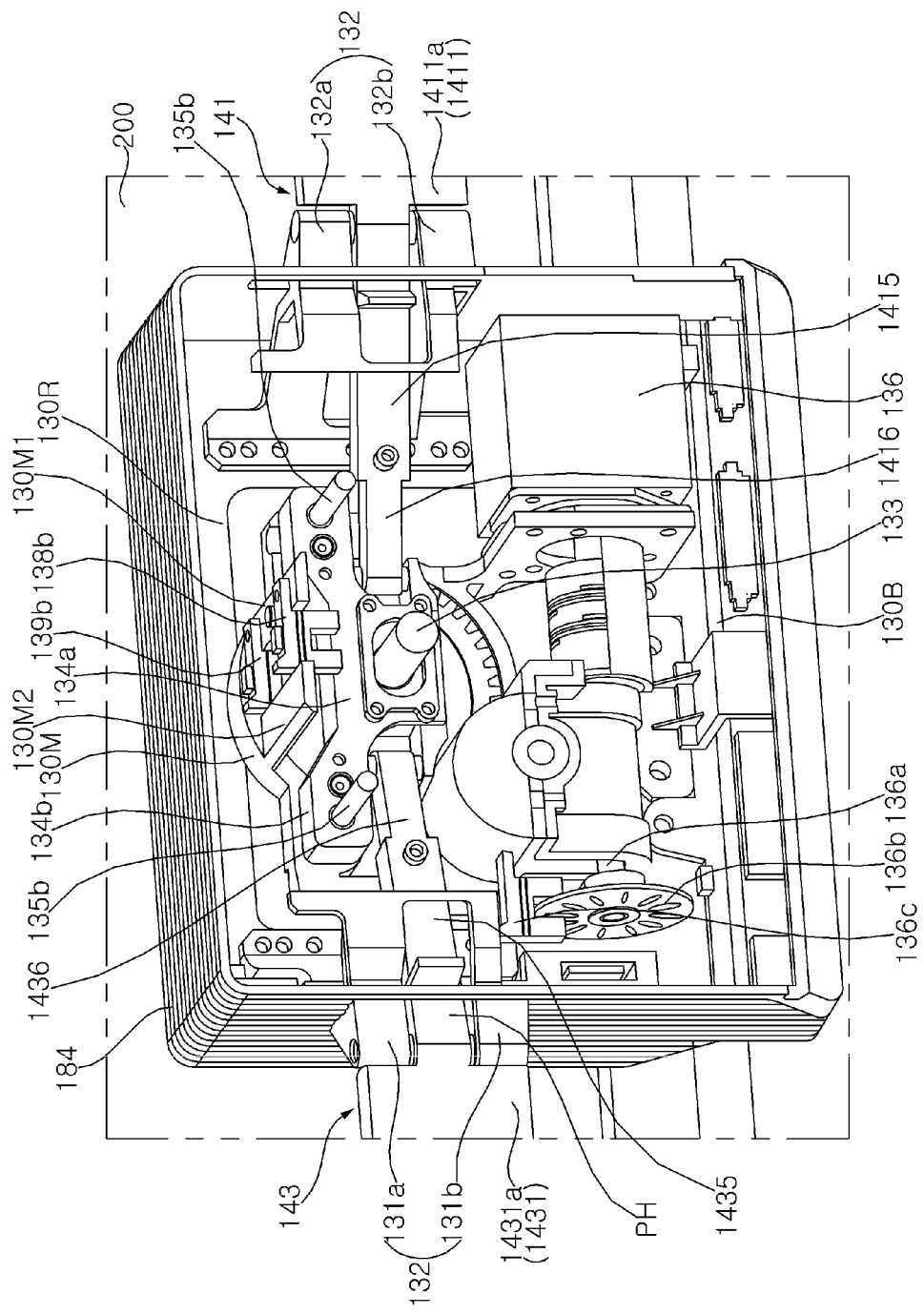

Referring to FIG. 18, a disc indicator 136*b* may be adjacent to a distal end of the rotating shaft 136*a* of the motor 136, and may be fixed to the rotating shaft 136*a*. The disc indicator 136*b* may include a plurality of holes (no reference numeral) spaced apart from one another in a circumferential direction of the disc indicator 136*b*.

A counter sensor 136*c* may be adjacent to the disc indicator 136*b*, and may be fixed to the base 130B or the second wing bracket 132. The counter sensor 136*c* may be a photo sensor. The counter sensor 136*c* may have a horseshoe shape. A light-emitting portion and a light-receiving portion of the counter sensor 136*c* may be spaced apart from each other while facing each other. When the rotating shaft 136*a* rotates, the disc indicator 136*b* may rotate while passing between the light-emitting portion and the light-receiving portion of the counter sensor 136*c*. In response to the rotation of the disc indicator 136*b*, light of the light-emitting portion of the counter sensor 136*c* may pass through the holes of the disc indicator 136*b* or may be blocked by the disc indicator 136*b*.

Accordingly, the counter sensor 136*c* may detect the number of rotations and/or the amount of rotation of the motor 136.

A mount 130M may be adjacent to an outer circumference of the drive gear 137*c*, and may be fixed to the rear bracket 130R. An extension portion 130M1, 130M2 may extend from the mount 130M in a direction parallel to the lead screw 133. The extension portion 130M1, 130M2 may be disposed on an upper side of the slider 134*a* or an upper side of the slider guide 134*b*.

A pin indicator 138*a* (see FIG. 17) may be fixed on the slider 134*a* or the slider guide 134*b*. The pin indicator 138*a* may have a pin shape.

A first sensor 138*b* may be coupled to the extension portion 130M1. Alternatively, the first sensor 138*b* may be coupled to the front bracket 130F. The first sensor 138*b* may be a photo sensor. The first sensor 138*b* may have a horseshoe shape. A light-emitting portion and a light-receiving portion of the first sensor 138*b* may be spaced apart from each other while facing each other. The pin indicator 138*a* may pass between the light-emitting portion and the light-receiving portion of the first sensor 138*b* as the slider 134*a* performs a linear reciprocating motion. In response to the movement of the pin indicator 138*a*, light of the light-emitting portion of the first sensor 138*b* may be provided to the light receiving-portion of the first sensor 138*b* or may be blocked by the pin indicator 138*a*.

Accordingly, the first sensor 138*b* may detect the approach of the pin indicator 138*a*. When the slider 134*a* is located closer to the front bracket 130F, the first sensor 138*b* may detect the pin indicator 138*a* (see FIGS. 19 and 20). At this time, as will be described later with reference to FIGS. 21 to 23, the plate 120 and the display panel 110, which are coupled to the slider 134*a* through the wing 141, 143 and the side frame 151, 153, may have a minimum curvature, and this position may be referred to as a start point of the slider 134*a*. For example, the minimum curvature may be 'zero (0)', and accordingly the display panel 110 may be flat.

A second sensor 139*b* may be spaced rearward from the first sensor 138*b*, and may be coupled to the extension portion 130M1. Alternatively, the second sensor 139*b* may be coupled to the rear bracket 130R. The second sensor 139*b* may be a photo sensor. The second sensor 139*b* may have a horseshoe shape. A light-emitting portion and a light-receiving portion of the second sensor 139*b* may be spaced apart from each other while facing each other. The pin indicator 138*a* may pass between the light-emitting portion and the light-receiving portion of the second sensor 139*b* as the slider 134*a* performs a linear reciprocating motion. In response to the movement of the pin indicator 138*a*, light of the light-emitting portion of the second sensor 139*b* may be provided to the light-receiving portion of the second sensor 139*b* or may be blocked by the pin indicator 138*a*.

Accordingly, the second sensor 139*b* may detect the approach of the pin indicator 138*a*. When the slider 134*a* is located closer to the rear bracket 130R, the second sensor 139*b* may detect the pin indicator 138*a* (see FIGS. 19 and 20). At this time, as will be described later with reference to FIGS. 21 to 23, the plate 120 and the display panel 110, which are coupled to the slider 134*a* through the wing 141, 143 and the side frame 151, 153, may have a maximum curvature, and this position may be referred to as a terminal point of the slider 134*a*. For example, a minimum radius of curvature may be 1,000 mm, 800 mm, or 700 mm.

The display device may include at least one of the counter sensor 136*c*, the first sensor 138*b*, and the second sensor 139*b*.

Figure 19:
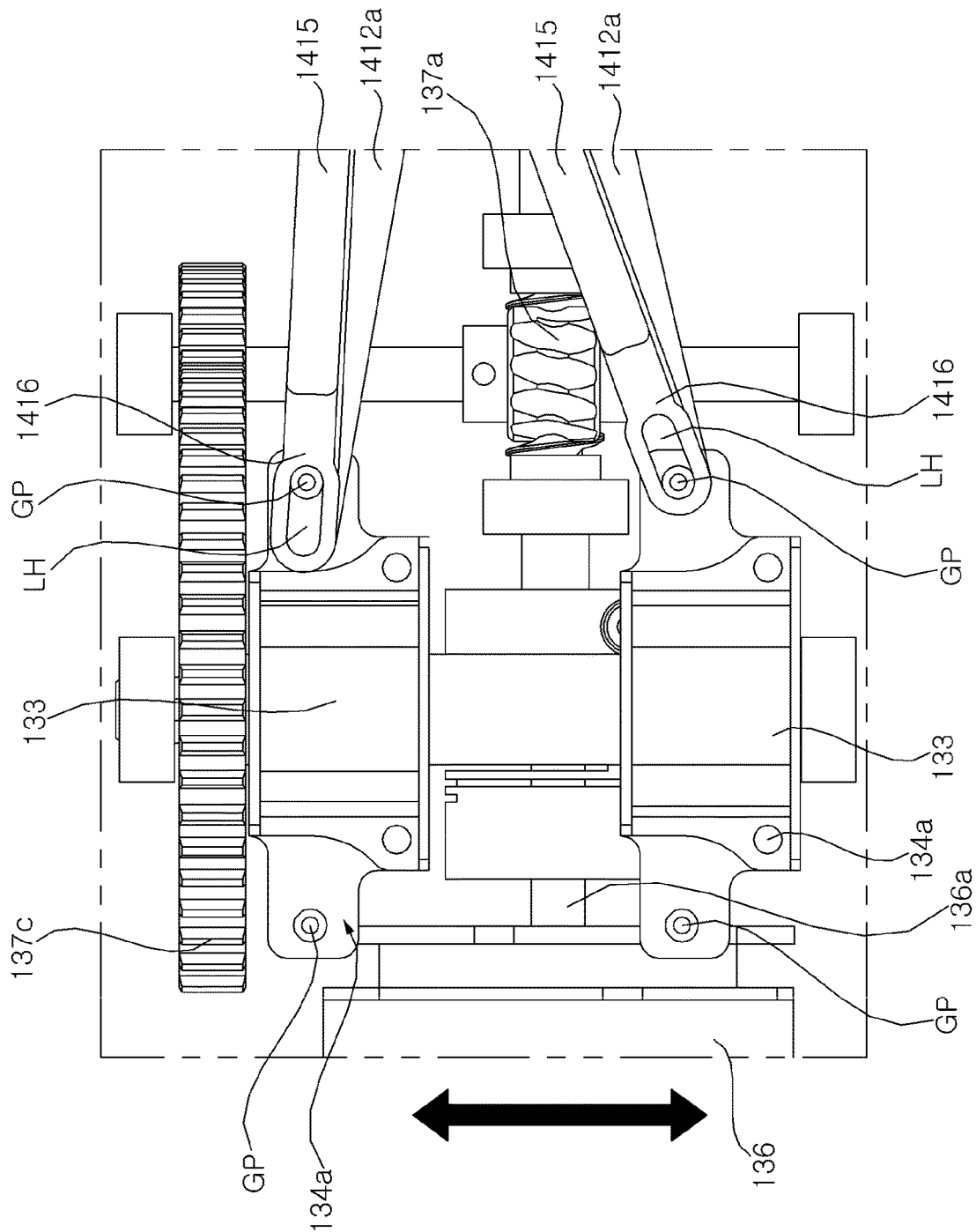
Figure 20:
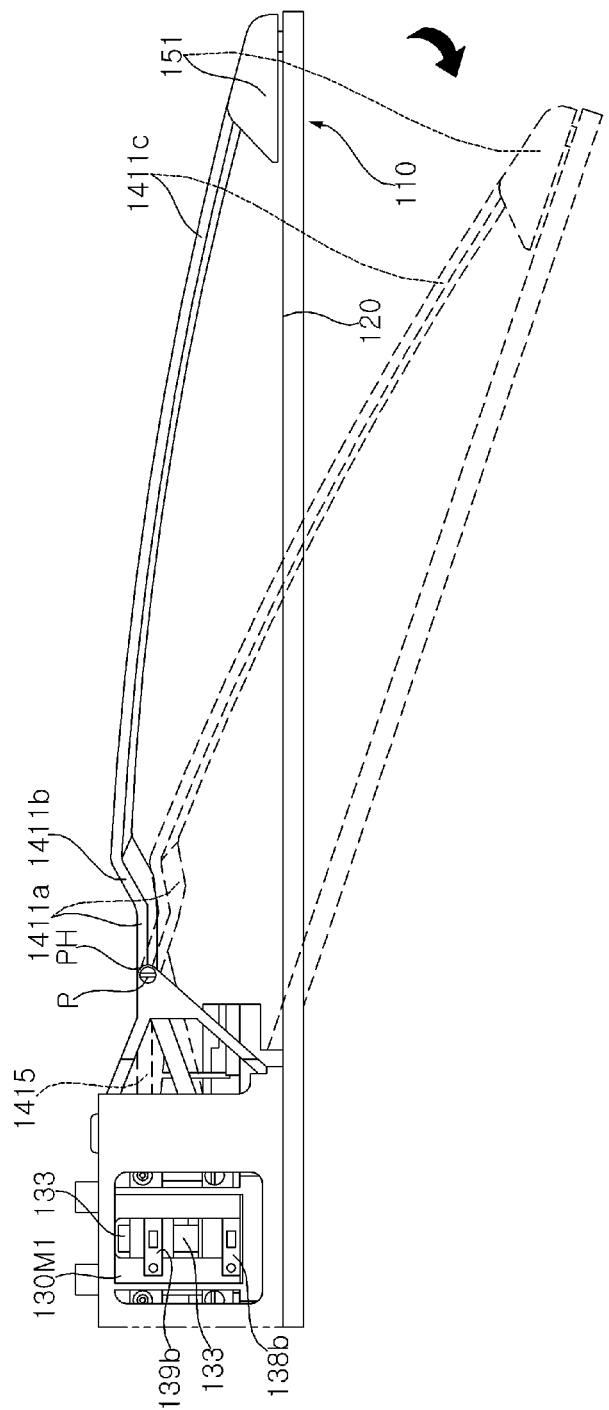

Referring to FIGS. 19 and 20, the wing plate 1411 may include a first part 1411*a*, a second part 1411*b*, and a third part 1411*c*. The first part 1411*a* may be disposed opposite the lever 1415 with respect to the pivot shaft PH. The first part 1411*a* may be bent at the lever 1415, and may form an obtuse angle with respect to the lever 1415. The second part 1411*b* may be bent at the first part 1411*a*, may be substantially parallel to the lever 1415, and may form an obtuse angle with respect to the first part 1411*a*. The third part 1411*c* may be bent at the second part 1411*b*, may be substantially parallel to the first part 1411*a*, and may form an obtuse angle with respect to the second part 1411*b*.

The second wing 141 may include a connecting rod 1416. The connecting rod 1416 may be fixed to or extend from the lever 1415. The connecting rod 1416 may be connected to the slider 134*a*. The connecting rod 1416 may be pivotally connected to the slider 134*a*. The connecting rod 1416 may include a long hole LH. The long hole LH may be formed on a distal end of the connecting rod 1416 that is adjacent to the slider 134*a*. The slider 134*a* may include a connecting pin GP. The connecting pin GP may have a cylindrical shape. A diameter of the connecting pin GP may be substantially the same as a width of the long hole LH.

When the lead screw 133 rotates, the slider 134*a* may reciprocate in the longitudinal direction of the lead screw 133. The lever 1415 that is connected to the slider 134*a* by the connecting rod 1416 may move together with the slider 134a, and the second wing 141 may pivot about the pivot shaft PH. Here, the connecting pin GP may move inside the long hole LH.

Figure 21:
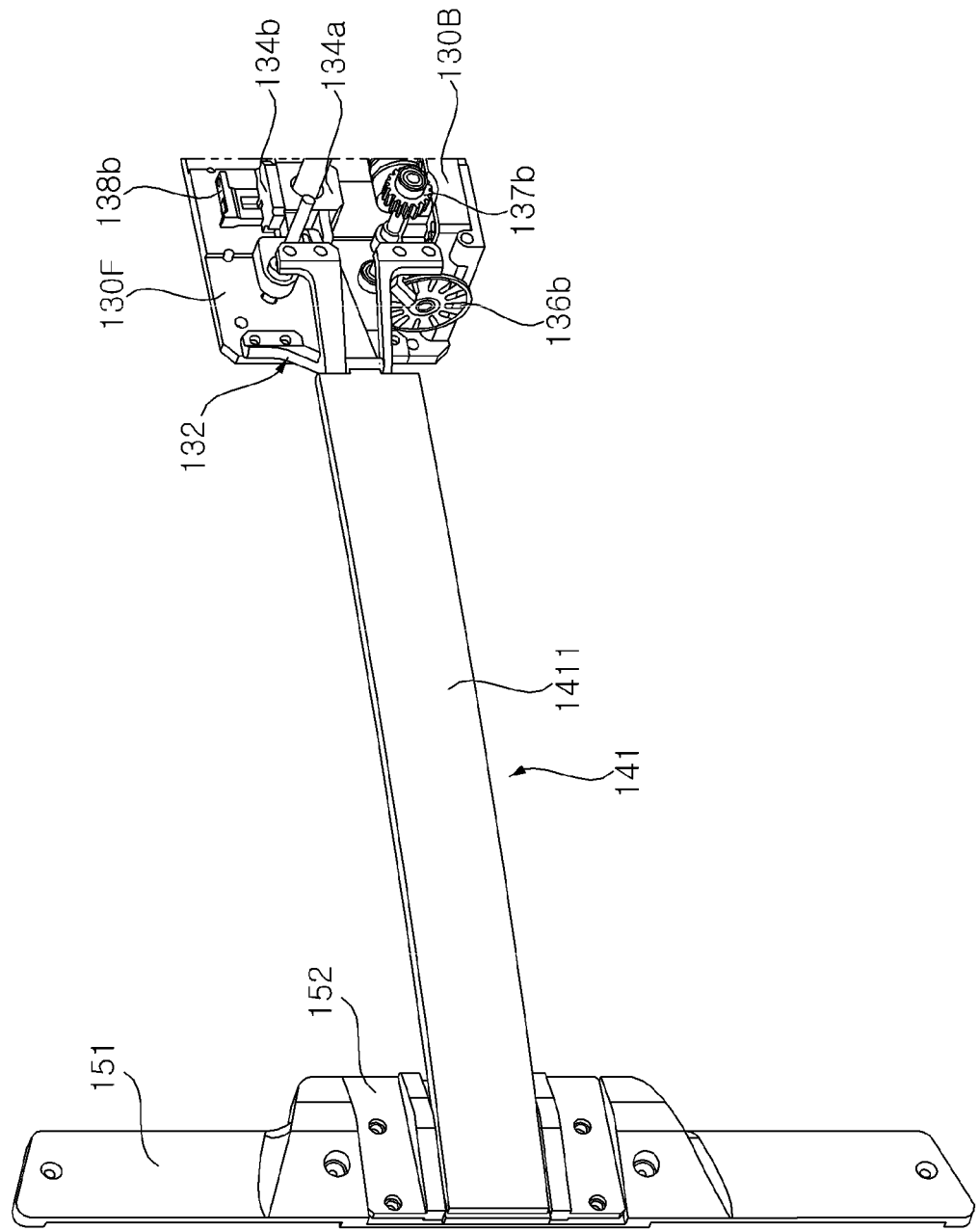
Figure 22:
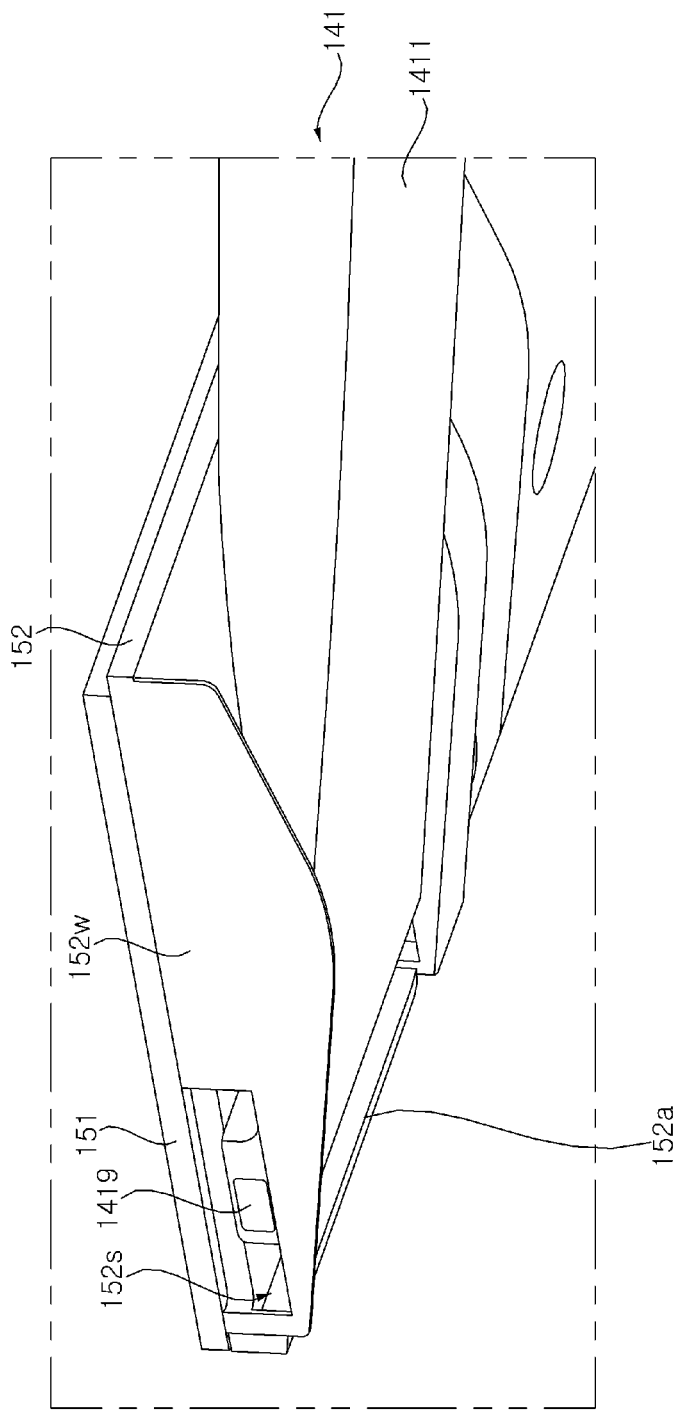
Figure 23:
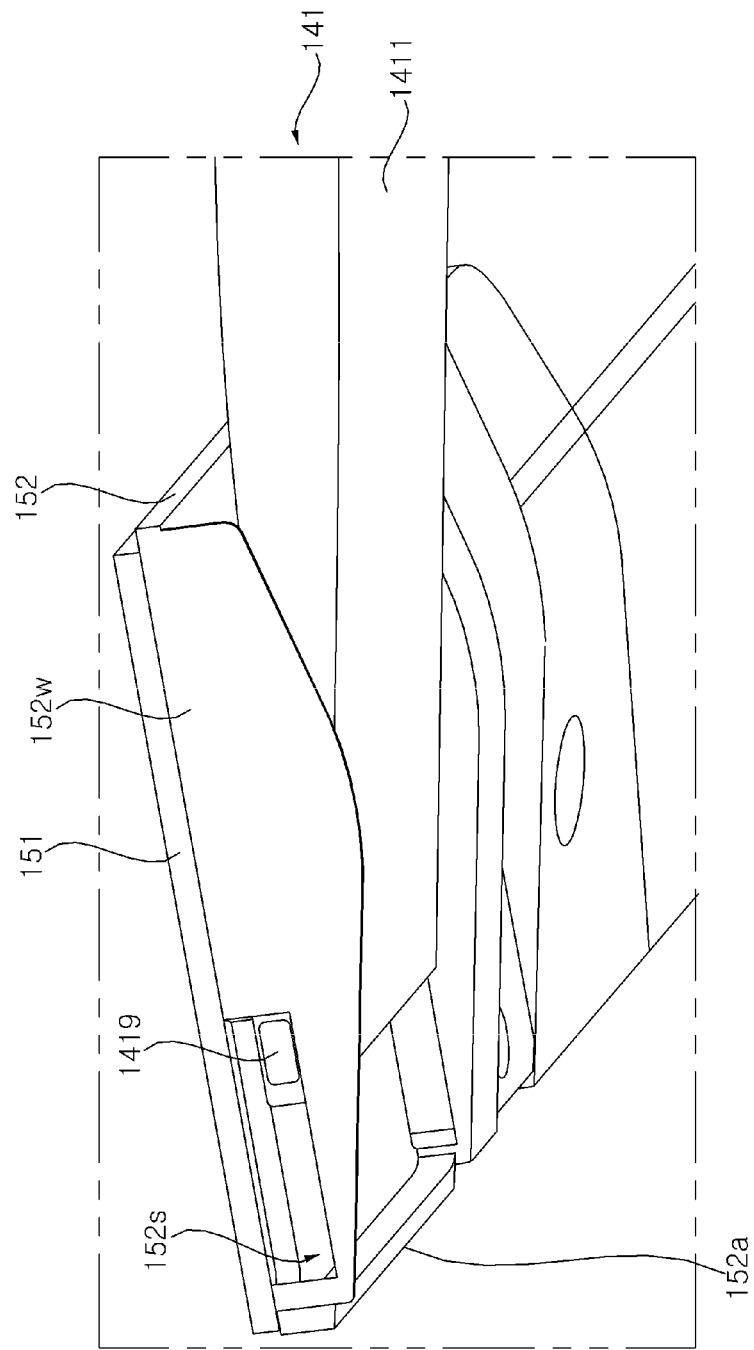

Referring to FIGS. 21 to 23, the side frame 151, 153 (see FIG. 15) may be coupled or fixed to the rear or the rear surface of the plate 120. As fastening members such as screws pass through the first side frame 153 to be fastened to the respective plurality of side fixing parts 162P (see FIG. 11) that are adjacent to the right side of the plate 120, the first side frame 153 may be coupled to the plate 120. As fastening members such as screws pass through the second side frame 151 to be fastened to the respective plurality of side fixing parts 162P (see FIG. 11) that are adjacent to the left side of the plate 120, the second side frame 151 may be coupled to the plate 120.

The second side frame 151 may include the sliding mount 152. The sliding mount 152 may be mounted on or fixed onto the side frame 151.

The second wing 141 may be coupled to the sliding mount 152 to be movable on the sliding mount 152. As the second wing 141 moves on the sliding mount 152, a distal end of the wing plate 1411 may be brought into contact with the sliding mount 152.

The sliding mount 152 may include a side wall 152W. The side wall 152W may face a side surface of the wing plate 1411. The wing plate 1411 may be brought into contact with the side wall 152W as the wing plate 1411 moves on the sliding mount 152. The side wall 152W may guide the movement of the wing plate 1411.

A guide slot 152S may be formed in the side wall 152W. The guide slot 152S may be formed through the side wall 152W in an elongated manner in a longitudinal direction of the wing plate 1411. For example, the guide slot 152S may be rectangular.

An end pin 1419 may be inserted into the guide slot 152S. The end pin 1419 may move on the guide slot 152S. The end pin 1419, together with the guide slot 152S, may limit or restrict the movement of the wing plate 1411. For example, the end pin 1419 may have a rectangular cross-section.

Accordingly, a force transmitted to the side frame 151 by the wing plate 1411 may be constantly maintained. In addition, as the display panel 110 and the plate 120 are curved, the flattening of regions adjacent to both ends of the display panel 110 and the plate 120 may be reduced or avoided.

In response to a pivot motion of the second wing 141, the second side frame 151 may push the plate 120 forward or pull the plate 120 rearward in a position adjacent to the left side of the plate 120. In response to a pivot motion of the first wing 143, the first side frame 153 may push the plate 120 forward or pull the plate 120 rearward in a position adjacent to the right side of the plate 120. That is, the plate 120 and the display panel 110 may be bent when pushed by the side frames 151 and 153, or may be flatten when pulled by the side frames 151 and 153.

Meanwhile, the sliding mount 152 may include a stopper 152a formed by bending a distal end thereof. When the plate 120 is maintained flat, the distal end of the wing plate 1411 may be in contact with the stopper 152a of the sliding mount 152. Accordingly, the front surface of the display panel 110 may be prevented from being curved convexly or outwardly due to both ends of the plate 120 being directed toward the rear of the display device 100.

Figure 24:
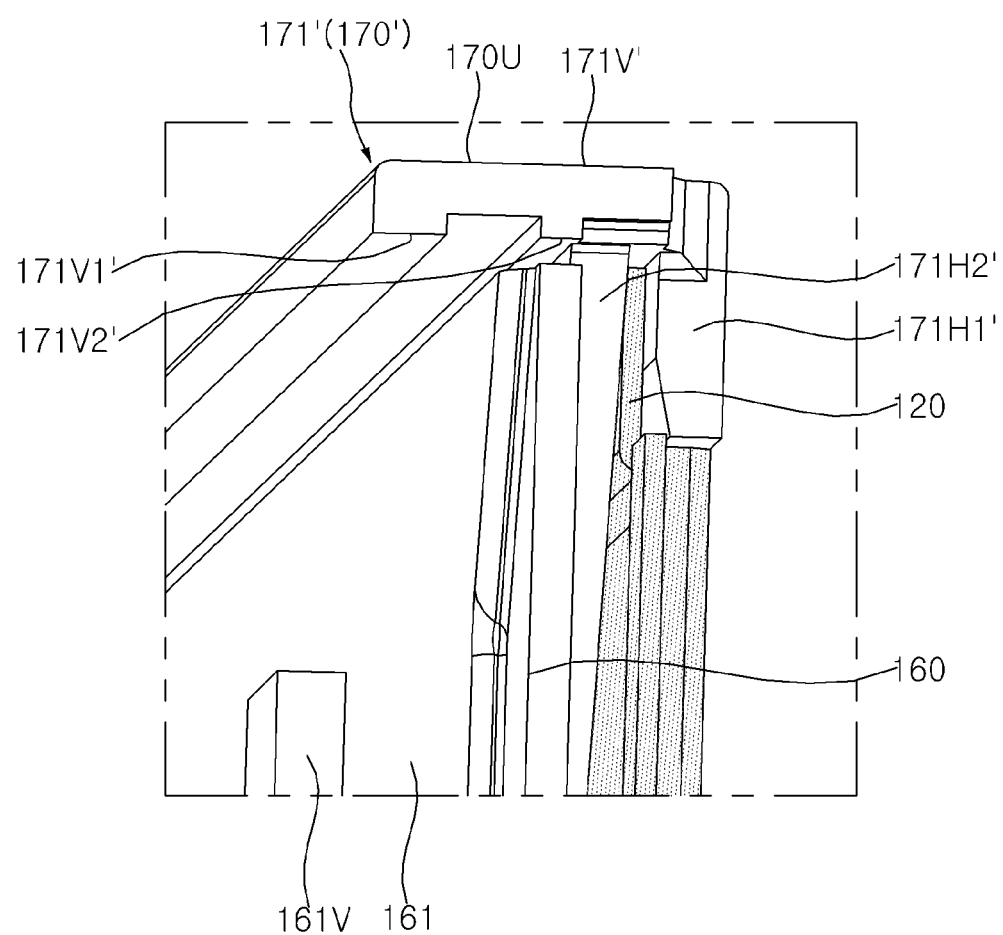

Referring to FIG. 24, a first frame 171' is a modified example of the first frame 171 described with reference to FIGS. 4, 8, and 28. The second frame 172 described above with reference to FIGS. 4 and 9 may also be modified like the first frame 171'. The first frame 171' may include a first vertical portion 171V' and a first horizontal portion 171H1', 171H2'. The first horizontal portion 171H1', 171H2' may be referred to as a first rib 171H1', 171H2'.

The first vertical portion 171V' may define an upper side 170U of a frame 170'. A length of the first vertical portion 171V' may be defined in the left-and-right direction, a width of the first vertical portion 171V' may be defined in the front-and-rear direction, and a thickness of the first vertical portion 171V' may be defined in the up-and-down direction.

The first horizontal portion 171H1', 171H2' may protrude from an inside of the first vertical portion 171V' in a direction intersecting the first vertical portion 171V'. A first rear horizontal portion 171H1' may protrude downward from a rear end of the first vertical portion 171V', and may extend in a longitudinal direction of the first vertical portion 171V'. A first center horizontal portion 171H2' may protrude downward between the rear end and a front end of the first vertical portion 171V', and may extend in the longitudinal direction of the first vertical portion 171V'. The first rear horizontal portion 171H1' may be referred to as a first rear rib 171H1', and the first center horizontal portion 171H2' may be referred to as a first center rib 171H2'.

An upper side of the plate 120 may be inserted between the first rear horizontal portion 171H1' and the first center horizontal portion 171H2'.

The inner plate 160 may be disposed opposite the plate 120 with respect to the first center horizontal portion 171H2'.

The display panel 110 (see FIG. 27) may be disposed under the first vertical portion 171V'.

A plurality of protruding portions 171V1' and 171V2' may be formed on the inside of the first vertical portion 171V', and may be disposed at the front of the first center horizontal portion 171H2'.

Figure 25:
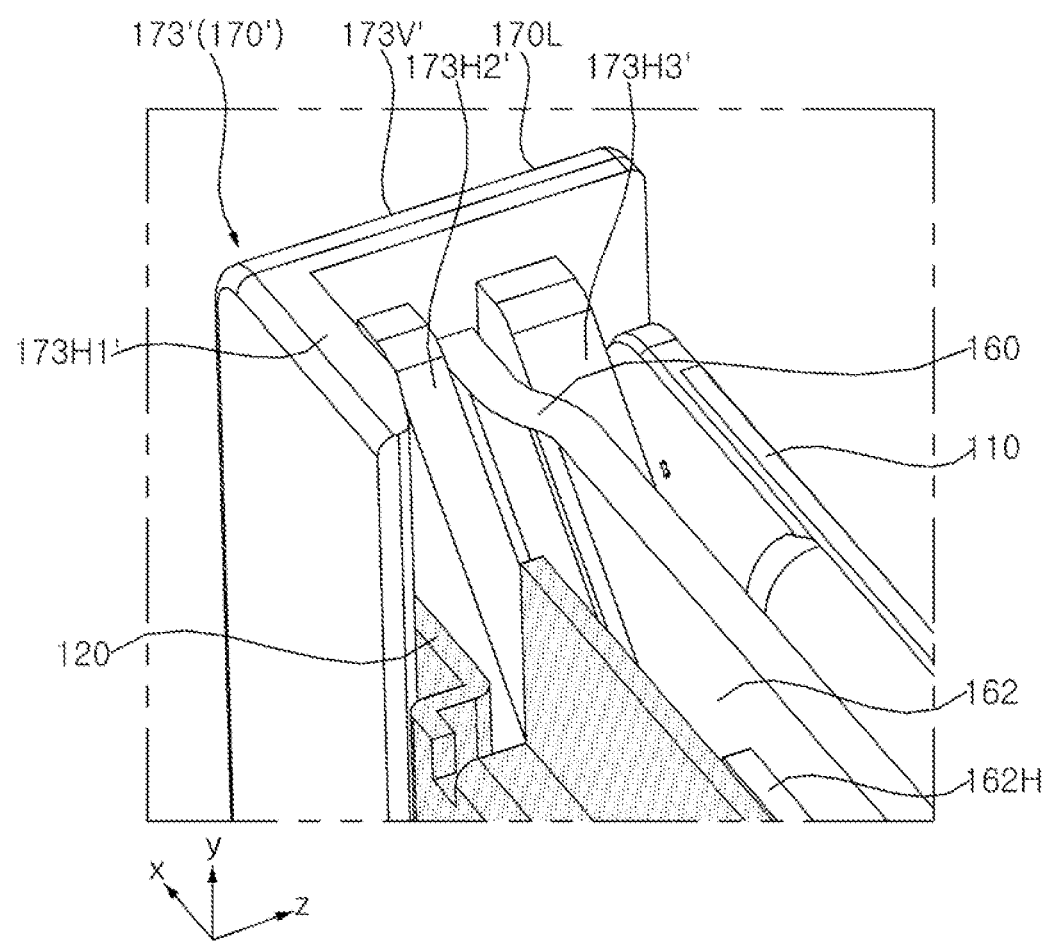

Referring to FIG. 25, a third frame 173' is a modified example of the third frame 173 described with reference to FIGS. 5, 10, and 29. The fourth frame 174 described above with reference to FIG. 5 may also be modified like the third frame 173'. The third frame 173' may include a third vertical portion 173V' and a third horizontal portion 173H1', 173H2', 173H3'. The third horizontal portion 173H1', 173H2', 173H3' may be referred to as a third rib 173H1', 173H2', 173H3'.

The third vertical portion 173V' may define a left side 170L of the frame 170'. A length of the third vertical portion 173V' may be defined in the up-and-down direction, a width of the third vertical portion 173V' may be defined in the front-and-rear direction, and a thickness of the third vertical portion 173V' may be defined in the left-and-right direction.

The third horizontal portion 173H1', 173H2', 173H3' may protrude from an inside of the third vertical portion 173V' in a direction intersecting the third vertical portion 173V'. A third rear horizontal portion 173H1' may protrude rightward from a rear end of the third vertical portion 173V', and may extend in a longitudinal direction of the third vertical portion 173V'. A third center horizontal portion 173H2' may protrude rightward between the rear end and a front end of the third vertical portion 173V', and may extend in the longitudinal direction of the third vertical portion 173V'. A third front horizontal portion 173H3' may be disposed opposite the third rear horizontal portion 173H1' with respect to the third center horizontal portion 173H2', may protrude rightward from the inside of the third vertical portion 173V', and may extend in the longitudinal direction of the third vertical portion 173V'. The third rear horizontal portion 173H1' may be referred to as a third rear rib 173H1', the third center horizontal portion 173H2' may be referred to as a third center rib 173H2', and the third front horizontal portion 173H3' may be referred to as a third front rib 173H3'.

The left side of the plate 120 may be inserted between the third rear horizontal portion 173H1' and the third center horizontal portion 173H2'.

The left side of the plate 160 may be inserted between the third center horizontal portion 173H2' and the third front horizontal portion 173H3'.

The display panel 110 may be disposed opposite the inner plate 160 with respect to the third front horizontal portion 173H3'. The display panel 110 may be disposed at the right of the third vertical portion 173V'.

Figure 26:
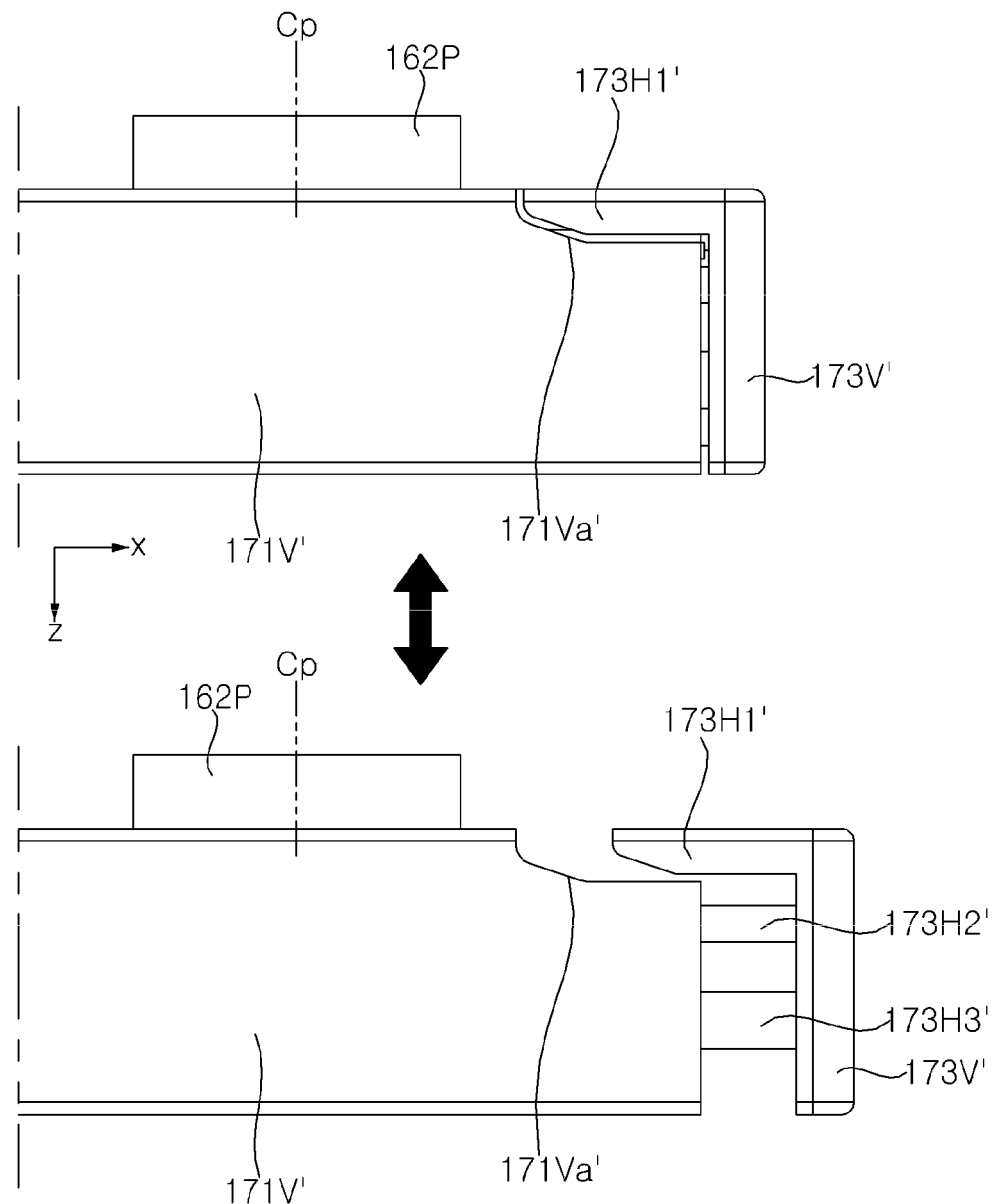
Figure 27:
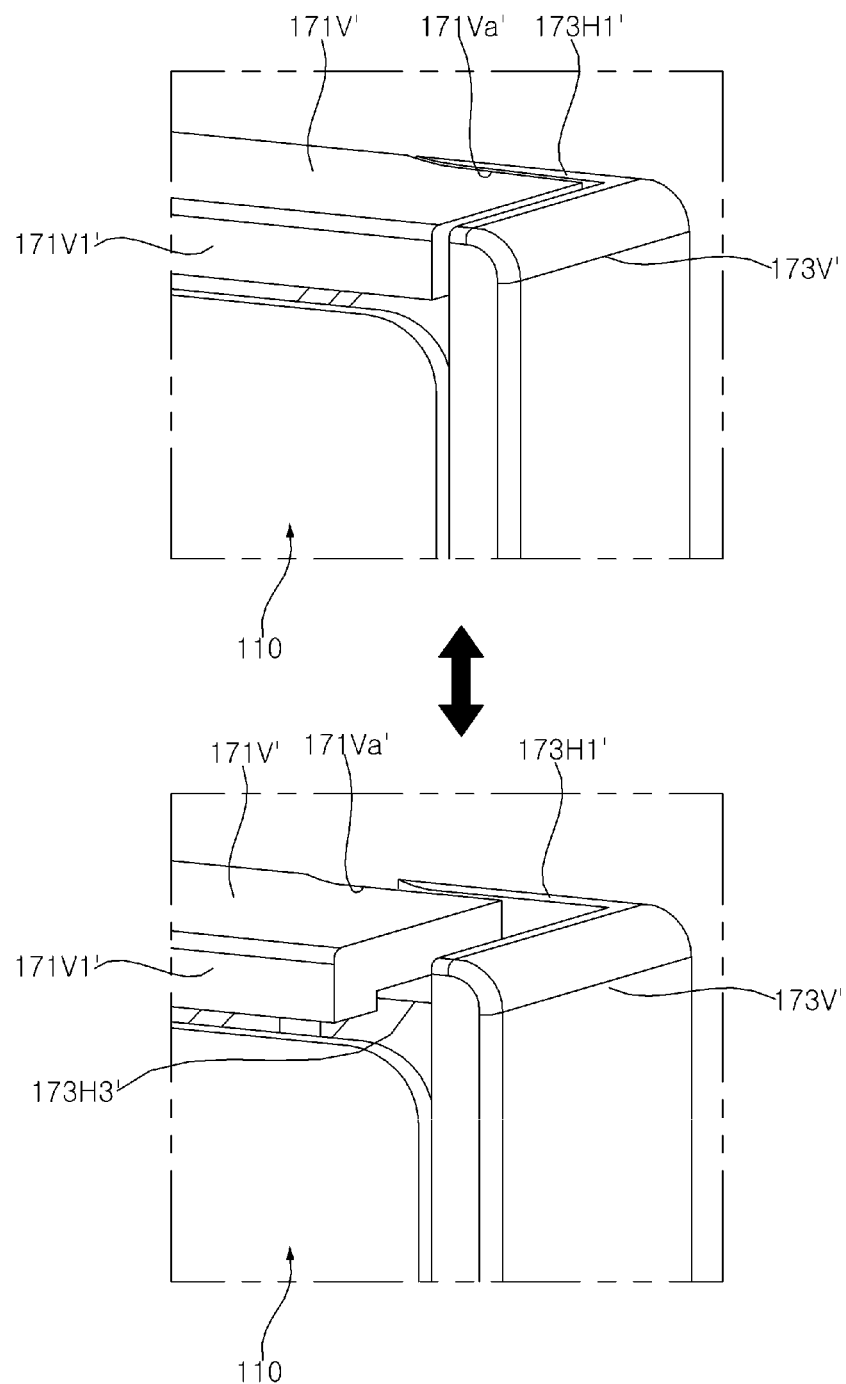

Referring to FIGS. 26 and 27, a first cut-out 171Va' may be formed by cutting out a portion of a left end of the first vertical portion 171V' and a portion of the first rear horizontal portion 171H1' (see FIG. 24). Here, the third rear horizontal portion 173H1' may be disposed at the first cut-out 171Va', and the third center horizontal portion 173H2' and the third front horizontal portion 173H3' may be disposed under the first vertical portion 171V'. In addition, the first cut-out 171Va' may have a shape that corresponds to the third rear horizontal portion 173H1', and may guide the movement of the third horizontal portion 173H1'.

A center line Cp of the side fixing part 162P may be located rightward relative to the left end of the first vertical portion 171V' and the third vertical portion 173V'. The side fixing part 162P may be located rightward relative to the first cut-out 171Va'. Here, the second side frame 151 (see FIG. 20) may be fixed to the side fixing part 162P.

In addition, the third frame 173' may be fixed to the display panel 110, and the first frame 171' may be fixed to the inner plate 160 that is disposed at the rear of the display panel 110.

Accordingly, when the second side frame 151 (see FIG. 20) pushes the side fixing part 162P forward, the display panel 110 may be curved or bent with a curvature greater than those of the inner plate 160 and the first frame 171', and the third frame 173' may slip with respect to the inner plate 160 and the first frame 171'. In other words, when the second side frame 151 (see FIG. 20) pushes the side fixing part 162P forward, the third frame 173' may be away from the first frame 171' to thereby achieve the bending of the display panel 110. Since a gap between the third frame 173' and the first frame 171' is formed on the left side (outside) of the side fixing part 162P, the third frame 173' may be linearly away from the first frame 171'.

Here, in the gap between the third frame 173' and the first frame 171', the third rear horizontal portion 173H1' may cover the rear of the third center horizontal portion 173H2' and the rear of the third front horizontal portion 173H3'. In addition, an upper surface of the first vertical portion 171V', an upper end of the third rear horizontal portion 173H1', and an upper end of the third vertical portion 173V' may be located on the same line. That is, although the third center horizontal portion 173H2' and the third front horizontal portion 173H3' are located at a lower position than the third vertical portion 173V', the first vertical portion 171V' and the third vertical portion 173V' may be recognized or viewed as continuous without a step, due to the third rear horizontal portion 173H1', by a user who sees the front surface of the display device 100.

The third rear horizontal portion 173H1' may be referred to as a gap cover 173H1'. For example, when a curvature of the display panel 110 is zero (0), the gap between the third frame 173' and the first frame 171' may be approximately 0.2 mm. For example, when a radius of curvature of the display panel 110 is 900 mm, the gap between the third frame 173' and the first frame 171' may be approximately 1.9 mm.

Figure 28:
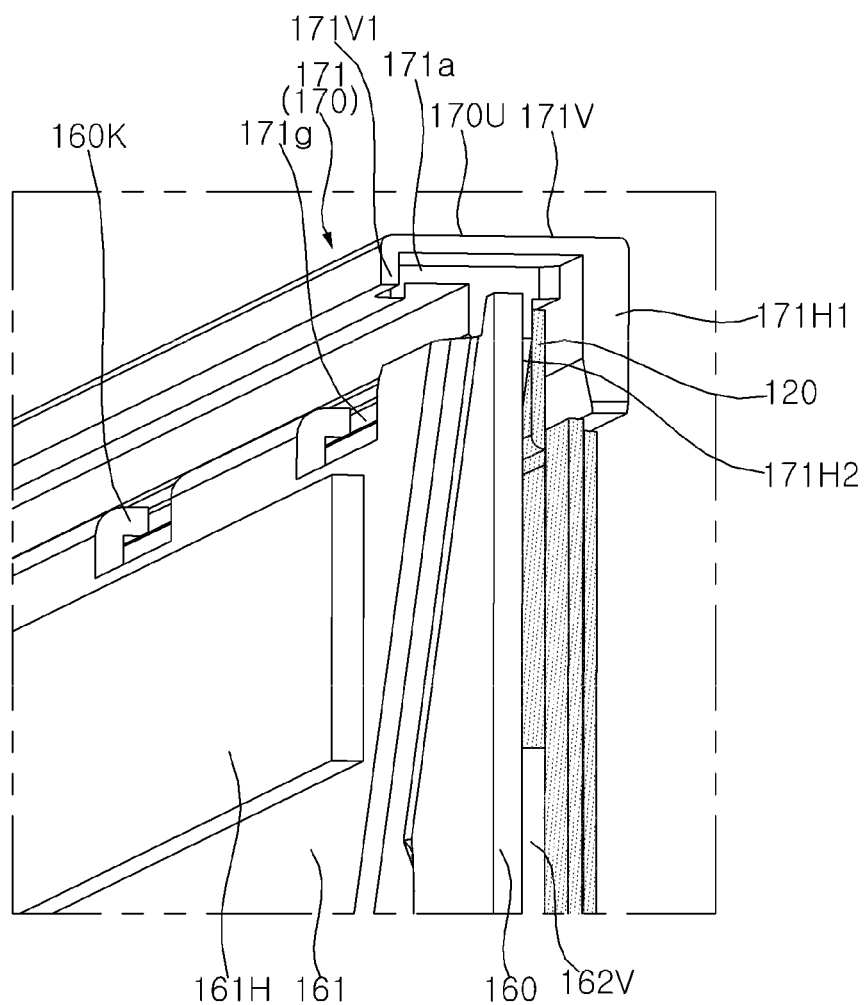

Referring to FIG. 28, the first frame 171 may include the first vertical portion 171V and the first horizontal portion 171H1, 171H2. The description of the first frame 171 may be equally applied to the second frame 172 (see FIG. 4). The first horizontal portion 171H1, 171H2 may be referred to as a first rib 171H1, 171H2.

The first vertical portion 171V may define an upper side 170U of the frame 170. A length of the first vertical portion 171V may be defined in the left-and-right direction, a width of the first vertical portion 171V may be defined in the front-and-rear direction, and a thickness of the first vertical portion 171V may be defined in the up-and-down direction.

The first horizontal portion 171H1, 171H2 may protrude from an inside of the first vertical portion 171V in a direction intersecting the first vertical portion 171V. A first rear horizontal portion 171H1 may protrude downward from a rear end of the first vertical portion 171V, and may extend in a longitudinal direction of the first vertical portion 171V. The first center horizontal portion 171H2 may protrude downward between the rear end and a front end of the first vertical portion 171V, and may extend in the longitudinal direction of the first vertical portion 171V. The first rear horizontal portion 171H1 may be referred to as a first rear rib 171H1, and the first center horizontal portion 171H2 may be referred to as a first center rib 171H2.

The upper side of the plate 120 may be inserted between the first rear horizontal portion 171H1 and the first center horizontal portion 171H2.

The inner plate 160 may be disposed opposite the plate 120 with respect to the first center horizontal portion 171H2. In addition, a plurality of coupling portions 160K may be bent rearward from the upper side of the inner plate 160, may be spaced apart from one another along the upper side of the inner plate 160, and may be inserted into a coupling groove 171g formed on a front surface of the first center horizontal portion 171H2. The coupling portions 160K and the coupling groove 171g may also be applied to the inner plate 160 and the first center horizontal portion 171H2' described above with reference to FIG. 24.

The display panel 110 (see FIG. 32) may be disposed under the first vertical portion 171V.

A guide groove 171a may be formed on the inside of the first vertical portion 171V, and may be disposed between the first rear horizontal portion 171H1 and a first protruding portion 171V1. A left guide groove 171a may be formed from a left end of the first vertical portion 171V to the right, and a right guide groove (not shown) may be formed from a right end of the first vertical portion 171V to the left.

Figure 29:
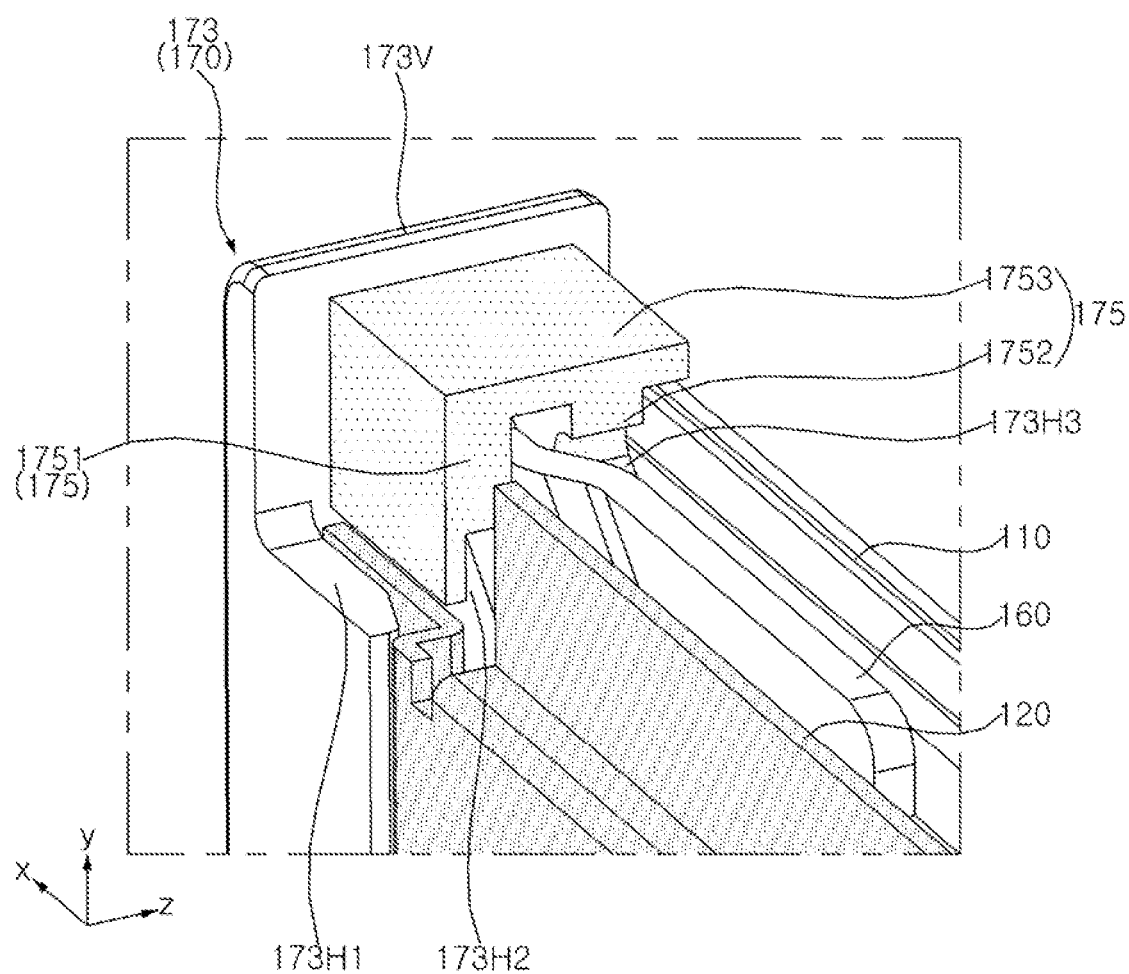

Referring to FIG. 29, the third frame 173 may include the third vertical portion 173V and the third horizontal portion 173H1, 173H2, 173H3. The description of the third frame 173 may be equally applied to the fourth frame 174 (see FIG. 5). The third horizontal portion 173H1, 173H2, 173H3 may be referred to as a third rib 173H1, 173H2, 173H3.

The third vertical portion 173V may define a left side 170L of the frame 170. A length of the third vertical portion 173V may be defined in the up-and-down direction, a width of the third vertical portion 173V may be defined in the front-and-rear direction, and a thickness of the third vertical portion 173V may be defined in the left-and-right direction.

The third horizontal portion 173H1, 173H2, 173H3 may protrude from an inside of the third vertical portion 173V in a direction intersecting the third vertical portion 173V. An upper end of the third horizontal portion 173H1, 173H2, 173H3 may be located at a lower position than an upper end of the third vertical portion 173V. A third rear horizontal portion 173H1 may protrude rightward from a rear end of the third vertical portion 173V, and may extend in a longitudinal direction of the third vertical portion 173V. A third center horizontal portion 173H2 may protrude rightward between the rear end and a front end of the third vertical portion 173V, and may extend in the longitudinal direction of the third vertical portion 173V. The third front horizontal portion 173H3 may be disposed opposite the third rear horizontal portion 173H1 with respect to the third center horizontal portion 173H2, may protrude rightward from the inside of the third vertical portion 173V, and may extend in the longitudinal direction of the third vertical portion 173V. The third rear horizontal portion 173H1 may be referred to as a third rear rib 173H1, the third center horizontal portion 173H2 may be referred to as a third center rib 173H2, and the third front horizontal portion 173H3 may be referred to as a third front rib 173H3.

The left side of the plate 120 may be inserted between the third rear horizontal portion 173H1 and the third center horizontal portion 173H2.

The left side of the inner plate 160 may be inserted between the third center horizontal portion 173H2 and the third front horizontal portion 173H3.

The display panel 110 may be disposed opposite the inner plate 160 with respect to the third front horizontal portion 173H3. The display panel 110 may be disposed at the right of the third vertical portion 173V.

Meanwhile, a gap cover 175 may be disposed on the third center horizontal portion 173H2 and the third front horizontal portion 173H3. For example, the gap cover 175 may be coupled to the third center horizontal portion 173H2 and the third front horizontal portion 173H3, and may be in contact with the inside of the third vertical portion 173V. In another example, the gap cover 175 may be coupled to the inside of the third vertical portion 173V, and may be in contact with the third horizontal portion 173H2 and the third front horizontal portion 173H3. In another example, the gap cover 175 may be coupled to the third center horizontal portion 173H2, the third front horizontal portion 173H3, and the inside of the vertical portion 173V.

The gap cover 175 may be coupled to the third center horizontal portion 173H2, the third front horizontal portion 173H3 and/or the third vertical portion 173V in an interference-fit manner or through attachment using a double-sided tape. Alternatively, the gap cover 175 may be formed as one body with the third horizontal portion 173H2, 173H3 and/or the third vertical portion 173V.

A left gap cover 175 may be coupled to an inside of the third frame 173, and a right gap cover (not shown) may be coupled to an inside of the fourth frame 174 (see FIG. 5).

The gap cover 175 may include a first leg 1751, a second leg 1752, and a cover portion 1753. The first leg 1751 may protrude upward from the third center horizontal portion 173H2. The second leg 1752 may protrude upward from the third front horizontal portion 173H3. The cover portion 1753 may be disposed on the first leg 1751 and the second leg 1752, and may be formed as one body with the first leg 1751 and the second leg 1752. The cover portion 1753 may be spaced downward from the upper end of the third vertical portion 173V, and may be formed flat.

For example, the gap cover 175 may include a metal material such as aluminum (Al). In another example, the gap cover 175 may include a plastic or resin material.

Figure 30:
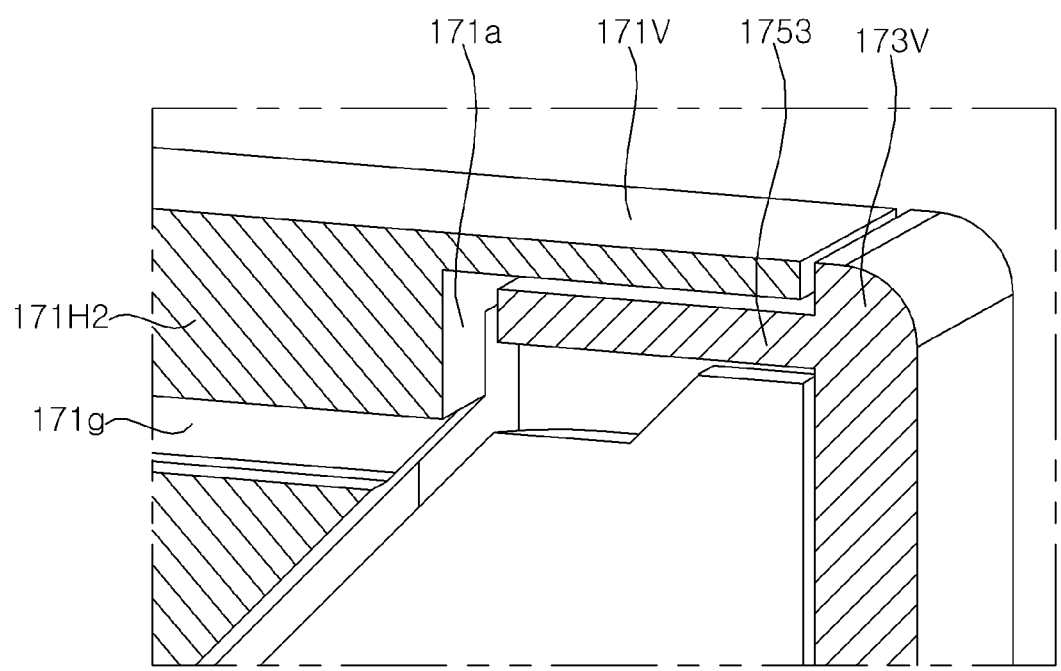

Referring to FIG. 30, the cover portion 1753 may have a shape that corresponds to the guide groove 171a. The cover portion 1753 may be inserted into the guide groove 171a. Accordingly, the guide groove 171a may guide the coupling or movement of the cover portion 1753.

Figure 31:
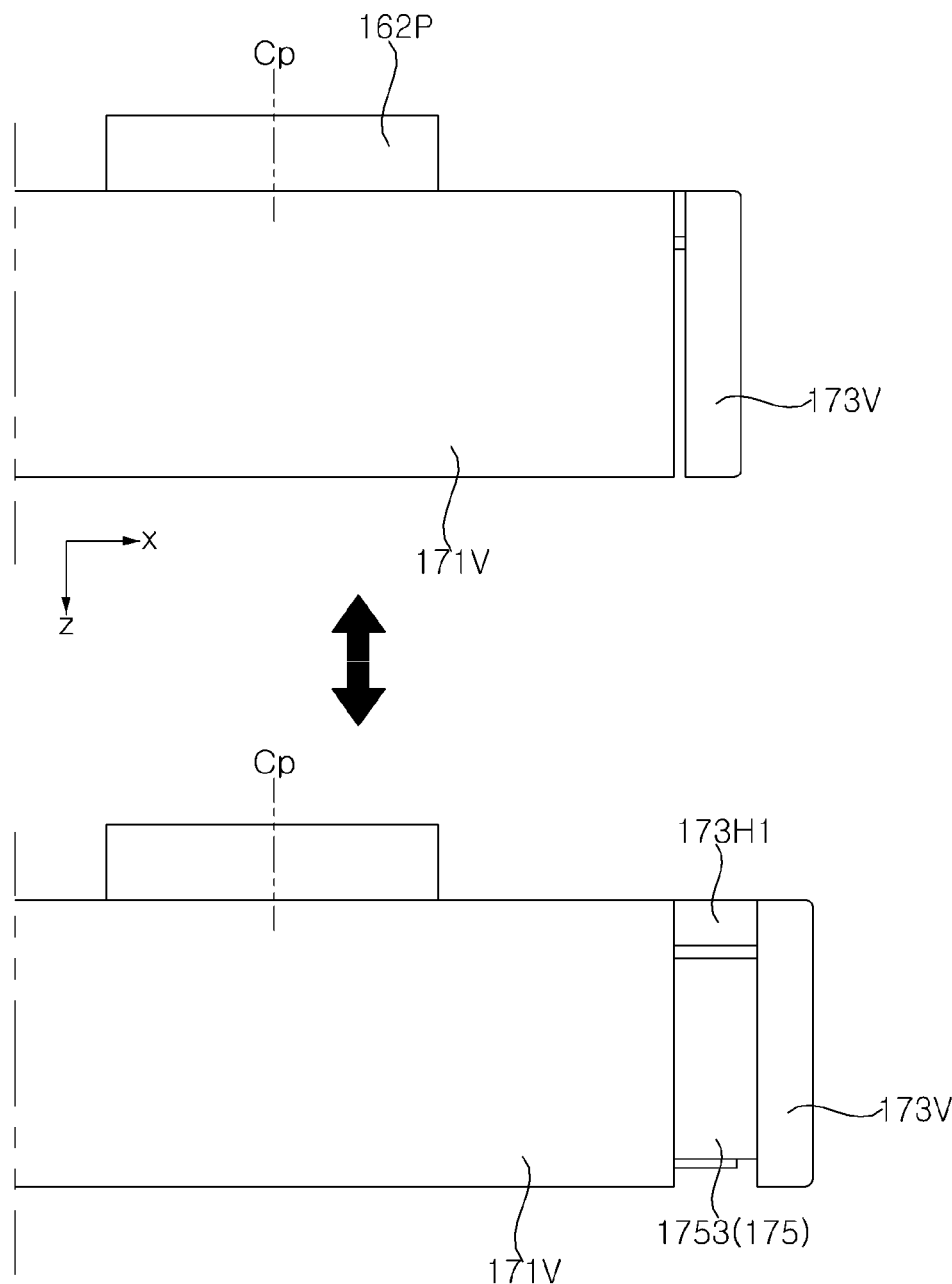
Figure 32:
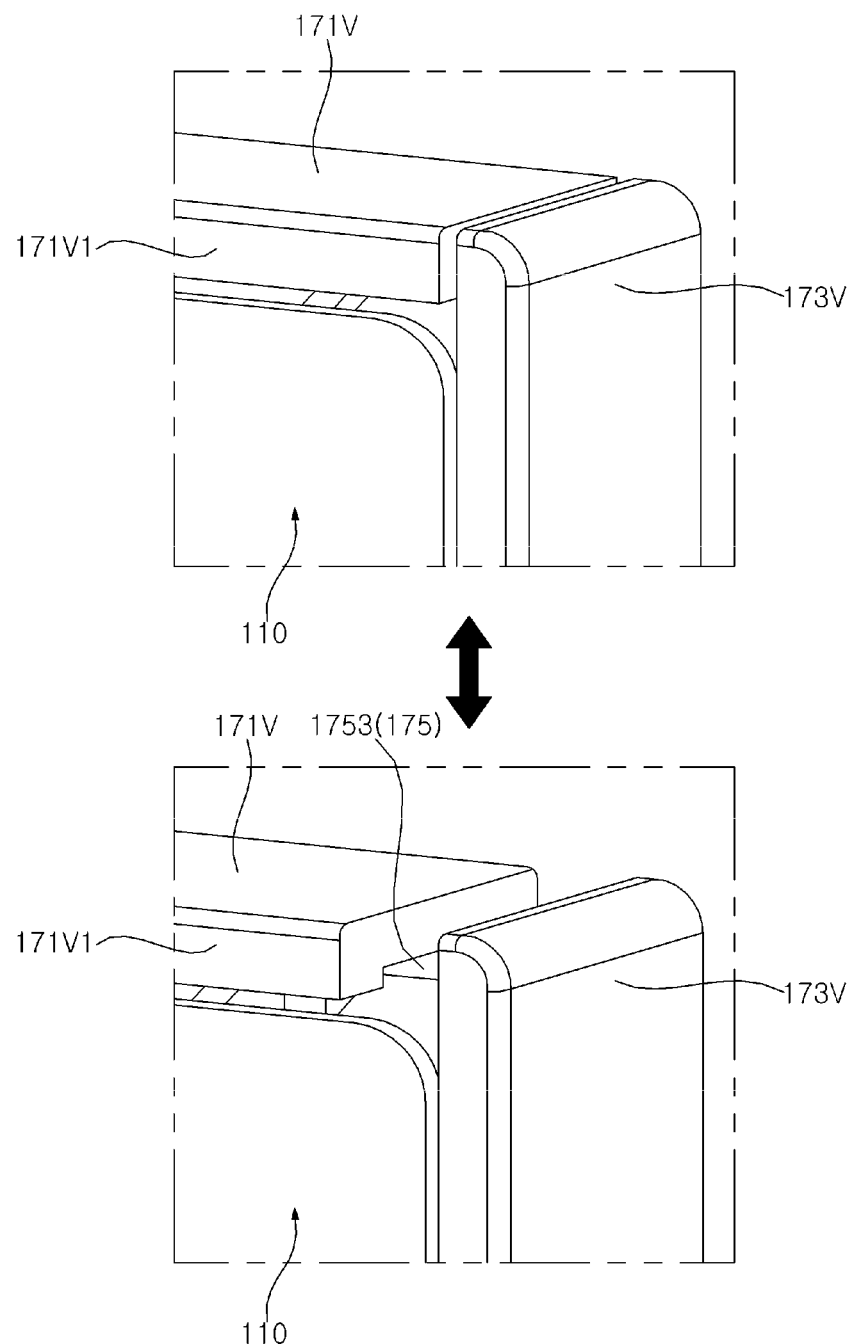

Referring to FIGS. 31 and 32, the third rear horizontal portion 173H1 may be disposed under the first rear horizontal portion 171H1, and the gap cover 175 may be disposed under the first vertical portion 171V.

A center line Cp of the side fixing part 162P may be located rightward relative to the left end of the first vertical portion 171V and the third vertical portion 173V. The side fixing part 162P may be located rightward relative to the left end of the first vertical portion 171V. Here, the second side frame 151 (see FIG. 20) may be fixed to the side fixing part 162P.

In addition, the third frame 173 may be fixed to the display panel 110, and the first frame 171 may be fixed to the inner plate 160 that is disposed at the rear of the display panel 110.

Accordingly, when the second side frame 151 (see FIG. 20) pushes the side fixing part 162P forward, the display panel 110 may be curved or bent with a curvature greater than those of the inner plate 160 and the first frame 171, and the third frame 173 may slip with respect to the inner plate 160 and the first frame 171. In other words, when the second side frame 151 (see FIG. 20) pushes the side fixing part 162P forward, the third frame 173 may be away from the first frame 171 to thereby achieve the bending of the display panel 110. Since a gap between the third frame 173 and the first frame 171 is formed on the left side (outside) of the side fixing part 162P, the third frame 173 may be linearly away from the first frame 171.

Here, in the gap between the third frame 173 and the first frame 171, the cover portion 1753 of the gap cover 175 may cover upper sides of the third center horizontal portion 173H2 and the third front horizontal portion 73H3. As the cover portion 1753 is disposed at the guide groove 171a, a step between an upper surface of the cover portion 1753 and an upper surface of the first vertical portion 171V, and a step between the upper surface of the cover portion 1753 and the upper end of the third vertical portion 173V may be minimized.

For example, when a curvature of the display panel 110 is zero (0), the gap between the third frame 173 and the first frame 171 may be approximately 0.2 mm. For example, when a radius of curvature of the display panel 110 is 900 mm, the gap between the third frame 173 and the first frame 171 may be approximately 1.9 mm.

Referring to FIGS. 1 to 32, a display panel according to one aspect of the present disclosure may include: a flexible display panel; a flexible inner plate disposed at a rear of the display panel and coupled to the display panel; a frame covering an edge of the inner plate; and a drive module disposed at a rear of the inner plate and configured to provide power to allow the inner plate and the display panel to be bent or flatten, wherein the frame includes: a top cover extending along a first side of the inner plate, the top cover being fixed to the inner plate to be bent or flatten along the inner plate; and a side cover extending along a second side of the inner plate that intersects the first side, the side cover being fixed to the display panel, and wherein a gap between the top cover and the side cover increases as the display panel is bent.

The top cover and the side cover may be separated from each other at a corner between the top cover and the side cover.

The side cover may include a gap cover adjacent to a rear end of the side cover and protruding from an inside of the side cover toward the top cover. The top cover may include a cut-out that having a shape that corresponds to a shape of the gap cover and at which the gap cover is disposed.

A distal end of the top cover, a distal end of the gap cover, and a distal end of the side cover may be located on a same line in a longitudinal direction of the side cover.

The display device may further include a flexible plate disposed at the rear of the inner plate and coupled to the inner plate. The side cover may include: a center horizontal portion protruding from the inside of the side cover; and a front horizontal portion protruding from the inside of the side cover and disposed opposite the gap cover with respect to the center horizontal portion. The inner plate may be inserted between the center horizontal portion and the front horizontal portion. The plate may be inserted between the gap cover and the center horizontal portion.

The side cover may include a pair of ribs protruding from an inside of the side cover. The second side of the inner plate may be inserted between the pair of ribs.

The side cover may include a gap cover coupled onto the pair of ribs and including a cover portion parallel to the top cover. The top cover may include a guide groove formed on an inner surface of the top cover and at which the cover portion is disposed.

The gap cover may include: a first leg protruding from the cover portion toward any one of the pair of ribs; and a second leg protruding from the cover portion toward the other one of the pair of ribs.

The cover portion may cover a top of the pair of ribs, and may have a shape that corresponds to the guide groove.

The pair of ribs may include a center horizontal portion and a front horizontal portion disposed opposite each other with respect to the inner plate. The display device may further include an adhesive member disposed between the front horizontal portion and the display panel, and coupled to the front horizontal portion and the display panel.

The display device may further include a flexible plate, disposed at the rear of the inner plate, and coupled to the inner plate. The side cover may include a rear horizontal portion protruding from the inside of the side cover and disposed opposite the inner plate with respect to the center horizontal portion. The plate may be inserted between the rear horizontal portion and the center horizontal portion.

In response to bending of the display panel, the side cover may be linearly away from or close to the top cover.

The drive module may include a slider configured to perform a linear reciprocating motion; and a motor configured to provide power to the slider. The display device may further include a wing disposed at the rear of the inner plate, having a first end coupled to the slider and a second end coupled to the inner plate, and including a pivot shaft adjacent to the first end.

The display device may further include a side frame coupled to the second end of the wing and disposed at the rear of the inner plate. The inner plate may include a side fixing part adjacent to the side cover, protruding from a rear surface of the inner plate, and to which the side frame is fixed.

The display device may further include a wing bracket disposed at the rear of the inner plate, coupled to the inner plate, and to which the pivot shaft is rotatably coupled. The motor may be a step motor. The drive module may further include a bracket fixed to the inner plate; a lead screw extending in a direction in which the slider performs the linear reciprocating motion, gear-connected to the motor, and rotatably coupled to the bracket; and a guide shaft parallel to the lead screw and fixed to the bracket. The slider may have a first side that is screw-coupled to the lead screw and a second side into which the guide shaft is inserted.

The effects of the display device according to the present disclosure will be described as follows.

According to at least one of the embodiments of the present disclosure, a structure that can freely change a curvature of a display panel may be provided.

According to at least one embodiment of the present disclosure, a mechanism that can freely change a curvature of a display panel may be provided.

According to at least one of the embodiments of the present disclosure, a flexible frame capable of being bent or flatten together with a display panel while covering an edge of the display panel may be provided.

According to at least one of the embodiments of the present disclosure, a structure that can guide the movement of a frame in response to a change in curvature of a display panel may be provided.

According to at least one of the embodiments of the present disclosure, a gap cover that can minimize exposure, through a gap in a corner of a frame, of an internal structure of a display device to the outside may be provided.

According to at least one of the embodiments of the present disclosure, a gap cover that can minimize a step on a corner of a frame may be provided.

Certain embodiments or other embodiments of the present disclosure described above are not mutually exclusive or distinct from each other. Any or all elements of the embodiments of the present disclosure described above may be combined or combined with each other in configuration or function.

For example, a configuration "A" described in one embodiment and/or drawings may be combined with a configuration "B" described in another embodiment and/or drawings. Namely, although the combination between the configurations is not directly described, the combination is possible except in the case where it is described that the combination is impossible.

The above detailed description should not be construed as restrictive in all respects and should be considered as illustrative. The scope of the present disclosure should be determined by a reasonable interpretation of the appended claims, and all modifications within the equivalent scope of the present disclosure are included in the scope of the present disclosure.

What is claimed is:

1. A display device comprising: a flexible display panel; a flexible inner plate disposed at a rear of the display panel and coupled to the display panel; a frame covering an edge of the display panel; and a drive module disposed at a rear of the inner plate and configured to provide power to allow the inner plate and the display panel to be bent or flattened, wherein the frame comprises: a top cover extending along a first edge of the display panel and covering the first edge, the top cover being fixed to the inner plate to be bent or flattened along the inner plate; and a side cover extending along a second edge of the display panel that intersects the first edge and covering the second edge, the side cover being fixed to the display panel, wherein the side cover moves away from the top cover as the display panel and the inner plate are bent, causing a front surface of the display panel to become concave, and wherein a gap between the top cover and the side cover increases as the display panel is bent.

2. The display device of claim 1, wherein the top cover and the side cover are separated from each other at a corner between the top cover and the side cover.

3. The display device of claim 1, wherein the side cover comprises a gap cover adjacent to a rear end of the side cover and protruding from an inside of the side cover toward the top cover, and
wherein the top cover comprises a cut-out having a shape that corresponds to a shape of the gap cover and at which the gap cover is disposed.

4. The display device of claim 3, wherein a distal end of the top cover, a distal end of the gap cover, and a distal end of the side cover are located on a same line in a longitudinal direction of the top cover.

5. The display device of claim 4, further comprising a flexible plate disposed at the rear of the inner plate and coupled to the inner plate,
wherein the side cover comprises:
a center horizontal portion protruding from the inside of the side cover; and
a front horizontal portion protruding from the inside of the side cover and disposed opposite the gap cover with respect to the center horizontal portion,
wherein the inner plate is inserted between the center horizontal portion and the front horizontal portion, and
wherein the plate is inserted between the gap cover and the center horizontal portion.

6. The display device of claim 1, wherein the side cover comprises a pair of ribs protruding from an inside of the side cover, and
wherein the inner plate is inserted between the pair of ribs.

7. The display device of claim 6, wherein the side cover comprises a gap cover coupled onto the pair of ribs, the gap cover comprising a cover portion parallel to the top cover, and
wherein the top cover comprises a guide groove formed on an inner surface of the top cover and at which the cover portion is disposed.

8. The display device of claim 7, wherein the gap cover comprises:
a first leg protruding from the cover portion toward any one of the pair of ribs; and
a second leg protruding from the cover portion toward the other one of the pair of ribs.

9. The display device of claim 7, wherein the cover portion covers a top of the pair of ribs and has a shape that corresponds to the guide groove.

10. The display device of claim 7, wherein the pair of ribs comprises a center horizontal portion and a front horizontal portion disposed opposite each other with respect to the inner plate, and
wherein the display device further comprises an adhesive member disposed between the front horizontal portion and the display panel, and coupled to the front horizontal portion and the display panel.

11. The display device of claim 10, further comprising a flexible plate disposed at the rear of the inner plate and coupled to the inner plate,
wherein the side cover comprises a rear horizontal portion protruding from the inside of the side cover and disposed opposite the inner plate with respect to the center horizontal portion, and
wherein the plate is inserted between the rear horizontal portion and the center horizontal portion.

12. The display device of claim 1, wherein the side cover, in response to bending of the display panel, is linearly away from or close to the top cover.

13. The display device of claim 12, wherein the drive module comprises:
a slider configured to perform a linear reciprocating motion; and
a motor configured to provide power to the slider, and
wherein the display device further comprises a wing disposed at the rear of the inner plate and having a first end coupled to the slider and a second end coupled to the inner plate, the wing comprising a pivot shaft adjacent to the first end.

14. The display device of claim 13, further comprising a side frame coupled to the second end of the wing and disposed at the rear of the inner plate,
wherein the inner plate comprises a side fixing part adjacent to the side cover, protruding from a rear surface of the inner plate, and to which the side frame is fixed.

15. The display device of claim 13, further comprising a wing bracket disposed at the rear of the inner plate, coupled to the inner plate, and to which the pivot shaft is rotatably coupled,
wherein the motor is a step motor,
wherein the drive module further comprises:
a bracket fixed to the inner plate;
a lead screw extending in a direction in which the slider performs the linear reciprocating motion, gear-connected to the motor, and rotatably coupled to the bracket; and
a guide shaft parallel to the lead screw and fixed to the bracket, and
wherein the slider has a first side that is screw-coupled to the lead screw and a second side into which the guide shaft is inserted.

* * * * *